(12) United States Patent
Berberian et al.

(10) Patent No.: US 10,281,915 B2
(45) Date of Patent: May 7, 2019

(54) MULTI-PURPOSED SELF-PROPELLED DEVICE

(71) Applicant: Sphero, Inc., Boulder, CO (US)

(72) Inventors: Paul Berberian, Boulder, CO (US); Ian Bernstein, Boulder, CO (US); Adam Wilson, Longmont, CO (US); Kevin Hemmings, Broomfield, CO (US); Ross MacGregor, Erie, CO (US)

(73) Assignee: SPHERO, INC., Boulder, CO (US)

( * ) Notice: Subject to any disclaimer, the term of this patent is extended or adjusted under 35 U.S.C. 154(b) by 0 days.

(21) Appl. No.: 14/271,203

(22) Filed: May 6, 2014

(65) Prior Publication Data

US 2014/0238762 A1   Aug. 28, 2014

Related U.S. Application Data

(63) Continuation-in-part of application No. 14/035,841, filed on Sep. 24, 2013, now Pat. No. 9,193,404, which
(Continued)

(51) Int. Cl.
| | |
|---|---|
| *G05D 1/02* | (2006.01) |
| *A63H 29/22* | (2006.01) |
| *G05D 1/00* | (2006.01) |
| *B62D 61/00* | (2006.01) |
| *A63H 30/04* | (2006.01) |
| *A63H 33/00* | (2006.01) |
| *G01S 19/13* | (2010.01) |

(52) U.S. Cl.
CPC .......... *G05D 1/0088* (2013.01); *A63H 30/04* (2013.01); *A63H 33/005* (2013.01); *B62D 61/00* (2013.01); *G01S 19/13* (2013.01); *G05D 1/0022* (2013.01); *G05D 1/0038* (2013.01); *G05D 1/027* (2013.01); *G05D 1/0278* (2013.01); *G05D 1/0259* (2013.01); *G05D 2201/0214* (2013.01); *Y10S 901/01* (2013.01)

(58) Field of Classification Search
CPC ........ A63H 15/06; A63H 17/00; A63H 29/22; A63H 33/005; B25J 5/00; B25J 5/007; B25J 11/002; B25J 11/0025; G05D 1/021
See application file for complete search history.

(56) References Cited

U.S. PATENT DOCUMENTS

| | | |
|---|---|---|
| 90,546 A | 5/1869 | Huntington |
| 933,623 A | 9/1909 | Cecil |
| (Continued) | | |

FOREIGN PATENT DOCUMENTS

| | | |
|---|---|---|
| CN | 1302717 | 7/2001 |
| CN | 1765595 | 5/2006 |
| (Continued) | | |

OTHER PUBLICATIONS

US 9,342,073 B2, 05/2016, Berstein et al. (withdrawn)
(Continued)

*Primary Examiner* — Frank B Vanaman

(57) ABSTRACT

A multi-purposed, self-propelled device and method for operation of the self-propelled device. Certain variations can include a spherical housing having an internal drive system and a multifunctional payload space for use in a variety of applications.

14 Claims, 11 Drawing Sheets

Related U.S. Application Data is a continuation of application No. 13/342,853, filed on Jan. 3, 2012, now Pat. No. 8,571,781.

(60) Provisional application No. 61/820,109, filed on May 6, 2013, provisional application No. 61/430,023, filed on Jan. 5, 2011, provisional application No. 61/430,083, filed on Jan. 5, 2011, provisional application No. 61/553,923, filed on Oct. 31, 2011.

(56) References Cited

U.S. PATENT DOCUMENTS

| | | | |
|---|---|---|---|
| 1,263,262 A | | 4/1918 | McFaul |
| 2,796,601 A | | 11/1956 | Hagopian |
| 2,949,696 A | | 8/1960 | Easterling |
| 2,977,714 A | | 4/1961 | Gibson |
| 3,313,365 A | | 4/1967 | Jackson |
| 3,667,156 A | | 6/1972 | Tomiyama |
| 3,683,216 A | | 8/1972 | Post |
| 3,821,995 A | | 7/1974 | Aghnides |
| 4,310,987 A | | 1/1982 | Chieffo |
| 4,519,466 A | | 5/1985 | Shiraishi |
| 4,541,814 A | | 9/1985 | Martin |
| 4,601,675 A | * | 7/1986 | Robinson ............ A63H 33/005 446/449 |
| 4,733,737 A | * | 3/1988 | Falamak ...................... 180/7.1 |
| 4,893,182 A | | 1/1990 | Gautraud |
| 4,996,468 A | | 2/1991 | Field et al. |
| 5,087,000 A | | 2/1992 | Suto |
| 5,213,176 A | | 5/1993 | Oroku et al. |
| 5,297,951 A | | 3/1994 | Asai |
| 5,297,981 A | | 3/1994 | Maxim et al. |
| 5,342,051 A | | 8/1994 | Rankin et al. |
| 5,413,345 A | | 5/1995 | Nauck |
| 5,439,408 A | | 8/1995 | Wilkinson |
| 5,489,099 A | | 2/1996 | Rankin et al. |
| 5,513,854 A | | 3/1996 | Daver |
| 5,595,121 A | * | 1/1997 | Elliott ..................... A63G 7/00 104/288 |
| 5,628,232 A | | 5/1997 | Bakholdin et al. |
| 5,644,139 A | | 7/1997 | Allen et al. |
| 5,676,582 A | | 10/1997 | Lin |
| 5,739,657 A | | 4/1998 | Takayama et al. |
| 5,759,083 A | * | 6/1998 | Polumbaum et al. ........ 446/435 |
| 5,780,826 A | | 7/1998 | Hareyama et al. |
| 5,793,142 A | | 9/1998 | Richard |
| 5,871,386 A | | 2/1999 | Wagstaff |
| 5,952,796 A | | 9/1999 | Colgate et al. |
| 5,953,056 A | | 9/1999 | Tucker |
| 6,017,272 A | | 1/2000 | Rieder |
| 6,021,222 A | | 2/2000 | Yamagata |
| 6,144,128 A | | 11/2000 | Rosen |
| 6,227,933 B1 | | 5/2001 | Michaud et al. |
| 6,246,927 B1 | | 6/2001 | Dratman |
| 6,267,673 B1 | | 7/2001 | Miyamoto |
| 6,315,667 B1 | | 11/2001 | Steinhart |
| 6,320,352 B2 | | 11/2001 | Terazoe |
| 6,390,213 B1 | * | 5/2002 | Bleicher .................. A61G 7/08 180/19.3 |
| 6,439,956 B1 | | 7/2002 | Ho |
| 6,430,471 B1 | | 8/2002 | Kintou |
| 6,449,010 B1 | | 9/2002 | Tucker |
| 6,456,938 B1 | | 9/2002 | Bernard |
| 6,458,008 B1 | | 10/2002 | Hyneman |
| 6,459,955 B1 | | 10/2002 | Bartsch et al. |
| 6,502,657 B2 | * | 1/2003 | Kerrebrock et al. ......... 180/218 |
| 6,535,793 B2 | | 3/2003 | Allard |
| 6,573,883 B1 | | 6/2003 | Bartlett |
| 6,584,376 B1 | | 6/2003 | Van Kommer |
| 6,604,181 B1 | | 8/2003 | Moriya |
| 6,615,109 B1 | | 9/2003 | Matsuoka et al. |
| 6,764,373 B1 | | 7/2004 | Osawa et al. |
| 6,785,590 B2 | | 8/2004 | Kasuga et al. |
| 6,786,795 B1 | | 9/2004 | Mullaney et al. |
| 6,789,768 B1 | | 9/2004 | Kalisch |
| 6,856,696 B1 | | 2/2005 | Ajioka |
| 6,859,555 B1 | | 2/2005 | Fang |
| 6,901,110 B1 | | 5/2005 | Tsougarakis et al. |
| 6,902,464 B1 | | 6/2005 | Lee |
| 6,945,843 B1 | | 9/2005 | Motosko |
| 6,980,956 B1 | | 12/2005 | Takagi et al. |
| 7,058,205 B2 | | 6/2006 | Jepson et al. |
| 7,069,113 B2 | | 6/2006 | Matsuoka et al. |
| 7,130,741 B2 | | 10/2006 | Bodin et al. |
| 7,170,047 B2 | | 1/2007 | Pal |
| 7,173,604 B2 | | 2/2007 | Marvit et al. |
| 7,258,591 B2 | | 8/2007 | Xu et al. |
| 7,283,647 B2 | | 10/2007 | McNitt |
| 7,292,711 B2 | | 11/2007 | Kiraly et al. |
| 7,298,869 B1 | | 11/2007 | Abernathy |
| 7,324,663 B2 | | 1/2008 | Kiraly et al. |
| 7,328,671 B2 | | 2/2008 | Kates |
| 7,340,077 B2 | | 3/2008 | Gokturk et al. |
| 7,340,344 B2 | | 3/2008 | Chappell |
| 7,344,430 B2 | | 3/2008 | Hasty et al. |
| 7,409,924 B2 | | 8/2008 | Kates |
| 7,424,867 B2 | | 9/2008 | Kates |
| 7,432,718 B2 | | 10/2008 | Ishihara et al. |
| 7,463,001 B2 | | 12/2008 | Tsurukawa |
| 7,499,077 B2 | | 3/2009 | Li |
| 7,501,780 B2 | | 3/2009 | Yamamoto |
| 7,526,362 B2 | | 4/2009 | Kim et al. |
| 7,538,764 B2 | | 5/2009 | Salomie |
| 7,542,597 B2 | | 6/2009 | Rahn et al. |
| 7,639,874 B2 | | 12/2009 | Bushell et al. |
| 7,699,683 B2 | | 4/2010 | Caspi |
| 7,702,131 B2 | | 4/2010 | Chinen et al. |
| 7,714,880 B2 | | 5/2010 | Johnson |
| 7,714,895 B2 | | 5/2010 | Pretlove et al. |
| 7,726,422 B2 | | 6/2010 | Sun et al. |
| 7,729,537 B2 | | 6/2010 | Grady |
| 7,755,660 B2 | | 7/2010 | Nejikovsky et al. |
| 7,773,773 B2 | | 8/2010 | Abercrombie |
| 7,822,507 B2 | | 10/2010 | Ishihara et al. |
| 7,847,504 B2 | | 12/2010 | Hollis |
| 7,853,357 B2 | | 12/2010 | Sawada et al. |
| 7,889,226 B2 | | 2/2011 | Pescatore et al. |
| 7,957,837 B2 | | 6/2011 | Ziegler et al. |
| 7,979,162 B2 | | 7/2011 | Niemela et al. |
| 8,025,551 B2 | | 9/2011 | Torres et al. |
| 8,038,504 B1 | | 10/2011 | Wong |
| 8,077,914 B1 | | 12/2011 | Kaplan |
| 8,077,981 B2 | | 12/2011 | Elangovan et al. |
| 8,099,189 B2 | | 1/2012 | Kaznov et al. |
| 8,128,450 B2 | | 3/2012 | Imai |
| 8,128,500 B1 | | 3/2012 | Borst et al. |
| 8,142,287 B2 | | 3/2012 | Podoloff |
| 8,144,118 B2 | | 3/2012 | Hildreith |
| 8,180,436 B2 | | 5/2012 | Boyden et al. |
| 8,190,295 B1 | | 5/2012 | Garretson |
| 8,195,333 B2 | | 6/2012 | Ziegler et al. |
| 8,197,298 B2 | | 6/2012 | Willett |
| 8,210,289 B1 | * | 7/2012 | Lu et al. ..................... 180/7.1 |
| 8,258,917 B2 | | 9/2012 | Cai et al. |
| 8,269,447 B2 | | 9/2012 | Smoot et al. |
| 8,274,406 B2 | | 9/2012 | Karlsson et al. |
| 8,275,544 B1 | | 9/2012 | Wells et al. |
| 8,326,469 B2 | | 12/2012 | Phillips et al. |
| 8,330,639 B2 | | 12/2012 | Wong et al. |
| 8,352,643 B2 | | 1/2013 | Birnbaum et al. |
| 8,355,818 B2 | | 1/2013 | Nielsen et al. |
| 8,364,136 B2 | | 1/2013 | Hoffberg et al. |
| 8,376,756 B2 | | 2/2013 | Robb |
| 8,392,065 B2 | | 3/2013 | Tolstedt et al. |
| 8,396,611 B2 | | 3/2013 | Phillips et al. |
| 8,400,619 B1 | | 3/2013 | Bernstein et al. |
| 8,417,384 B2 | | 4/2013 | Togawa et al. |
| 8,430,192 B2 | | 4/2013 | Gillett |
| 8,442,661 B1 | | 5/2013 | Blackwell et al. |
| 8,456,298 B2 | | 6/2013 | Valtonen |
| 8,459,383 B1 | | 6/2013 | Burget |
| 8,522,902 B2 | | 9/2013 | Gomi et al. |
| 8,523,846 B2 | | 9/2013 | Makino |
| 8,540,038 B1 | | 9/2013 | Ullman |

(56) References Cited

U.S. PATENT DOCUMENTS

| | | |
|---|---|---|
| 8,571,781 B2 | 10/2013 | Bernstein et al. |
| 8,577,595 B2 | 11/2013 | Zhao et al. |
| 8,600,600 B2 | 12/2013 | Jung |
| 8,670,889 B2 | 3/2014 | Kaznov |
| 8,672,062 B2 | 3/2014 | Schroll et al. |
| 8,751,063 B2 | 6/2014 | Bernstein et al. |
| 8,766,983 B2 | 7/2014 | Marks et al. |
| 8,788,130 B1 | 7/2014 | Tran et al. |
| 8,805,947 B1 | 8/2014 | Kuzkin |
| 8,811,675 B2 | 8/2014 | Chadranshekar |
| 8,838,273 B2 | 9/2014 | Hvass et al. |
| 8,854,392 B2 | 10/2014 | Child |
| 8,862,301 B2 | 10/2014 | Araki et al. |
| 8,882,559 B2 | 11/2014 | Fessenmaier |
| 8,885,882 B1 | 11/2014 | Yin et al. |
| 9,008,860 B2 | 4/2015 | Waldock |
| 9,011,197 B2 | 4/2015 | Smoot et al. |
| 9,014,848 B2 | 4/2015 | Farlow et al. |
| 9,041,622 B2 | 5/2015 | McCulloch |
| 9,090,214 B2 | 7/2015 | Bernstein et al. |
| 9,114,838 B2 | 8/2015 | Bernstein et al. |
| 9,150,263 B2 | 10/2015 | Bernstein et al. |
| 9,171,211 B2 | 10/2015 | Keat |
| 9,193,404 B2 | 11/2015 | Bernstein et al. |
| 9,211,920 B1 | 12/2015 | Bernstein et al. |
| 9,218,316 B2 | 12/2015 | Bernstein et al. |
| 9,280,717 B2 | 3/2016 | Polo et al. |
| 9,290,220 B2 | 3/2016 | Bernstein et al. |
| 9,292,758 B2 | 3/2016 | Polo et al. |
| 9,389,612 B2 | 7/2016 | Bernstein et al. |
| 9,394,016 B2 | 7/2016 | Bernstein et al. |
| 9,395,725 B2 | 7/2016 | Berstein et al. |
| 9,429,940 B2 | 8/2016 | Bernstein et al. |
| 9,457,730 B2 | 10/2016 | Berstein et al. |
| 9,481,410 B2 | 11/2016 | Bernstein et al. |
| 9,483,876 B2 | 11/2016 | Polo et al. |
| 9,558,612 B2 | 1/2017 | Lyons |
| 2002/0011368 A1 | 1/2002 | Berg |
| 2002/0036104 A1 | 3/2002 | Kerrebrock et al. |
| 2002/0142701 A1 | 10/2002 | Rosenberg |
| 2003/0093182 A1 | 5/2003 | Yokoyama |
| 2003/0118217 A1 | 6/2003 | Kondo et al. |
| 2003/0179176 A1 | 9/2003 | Waterston |
| 2003/0216834 A1 | 11/2003 | Allard |
| 2003/0216835 A1 | 11/2003 | Wakui |
| 2004/0002843 A1 | 1/2004 | Robarts et al. |
| 2004/0013295 A1 | 1/2004 | Sabe |
| 2004/0015266 A1 | 1/2004 | Skoog |
| 2004/0158357 A1 | 8/2004 | Lee et al. |
| 2004/0168837 A1 | 9/2004 | Michaud et al. |
| 2004/0182614 A1 | 9/2004 | Wakui |
| 2004/0186623 A1 | 9/2004 | Dooley et al. |
| 2004/0192163 A1 | 9/2004 | Siegel |
| 2004/0198159 A1 | 10/2004 | Xu et al. |
| 2005/0004723 A1 | 1/2005 | Duggan et al. |
| 2005/0041839 A1 | 2/2005 | Saitou |
| 2005/0091684 A1 | 4/2005 | Kawabata |
| 2005/0186884 A1 | 8/2005 | Evans |
| 2005/0216186 A1 | 9/2005 | Dorfman |
| 2005/0226192 A1 | 10/2005 | Red et al. |
| 2005/0264472 A1 | 12/2005 | Rast |
| 2006/0080802 A1 | 4/2006 | Tani |
| 2006/0095158 A1 | 5/2006 | Lee et al. |
| 2006/0101465 A1 | 5/2006 | Kato et al. |
| 2006/0132318 A1 | 6/2006 | Shimizu |
| 2006/0241812 A1 | 10/2006 | Juang |
| 2006/0271251 A1 | 11/2006 | Hopkins |
| 2007/0034734 A1 | 2/2007 | Yoeli |
| 2007/0078004 A1 | 4/2007 | Suzuki |
| 2007/0085706 A1 | 4/2007 | Feyereisen et al. |
| 2007/0112462 A1 | 5/2007 | Kim et al. |
| 2007/0150103 A1 | 6/2007 | Im |
| 2007/0162862 A1 | 7/2007 | Ogasawara |
| 2007/0192910 A1 | 8/2007 | Vu |
| 2007/0215394 A1 | 9/2007 | Sun |
| 2007/0249422 A1 | 10/2007 | Podoloff |
| 2007/0259592 A1 | 11/2007 | Imai et al. |
| 2007/0282484 A1 | 12/2007 | Chung et al. |
| 2008/0009965 A1 | 1/2008 | Bruemmer et al. |
| 2008/0012518 A1 | 1/2008 | Yamamoto |
| 2008/0033641 A1 | 2/2008 | Medalia |
| 2008/0077284 A1 | 3/2008 | Swope |
| 2008/0082208 A1 | 4/2008 | Hong |
| 2008/0086236 A1 | 4/2008 | Saitou |
| 2008/0086241 A1 | 4/2008 | Phillips et al. |
| 2008/0121097 A1 | 5/2008 | Rudakevych et al. |
| 2008/0174268 A1 | 7/2008 | Koo et al. |
| 2008/0174448 A1 | 7/2008 | Hudson |
| 2008/0182479 A1 | 7/2008 | Elliott et al. |
| 2008/0240507 A1 | 10/2008 | Niwa et al. |
| 2008/0263628 A1 | 10/2008 | Norman et al. |
| 2008/0267450 A1 | 10/2008 | Sugimoto et al. |
| 2008/0269949 A1 | 10/2008 | Norman et al. |
| 2009/0016583 A1 | 1/2009 | Wolf |
| 2009/0018712 A1 | 1/2009 | Duncan |
| 2009/0028439 A1 | 1/2009 | Elangovan et al. |
| 2009/0033623 A1 | 2/2009 | Lin |
| 2009/0055019 A1 | 2/2009 | Stiehl et al. |
| 2009/0057238 A1 | 3/2009 | Garti |
| 2009/0069084 A1 | 3/2009 | Reece |
| 2009/0073034 A1 | 3/2009 | Linsky et al. |
| 2009/0078484 A1 | 3/2009 | Kocijan |
| 2009/0081923 A1 | 3/2009 | Dooley et al. |
| 2009/0118020 A1 | 5/2009 | Koivisto |
| 2009/0133467 A1 | 5/2009 | Mori et al. |
| 2009/0138232 A1 | 5/2009 | Fuwa |
| 2009/0153349 A1 | 6/2009 | Lin |
| 2009/0157221 A1 | 6/2009 | Sip |
| 2009/0161983 A1 | 6/2009 | Ciurea |
| 2009/0164638 A1 | 6/2009 | Jang |
| 2009/0171516 A1 | 7/2009 | Reich |
| 2009/0187299 A1 | 7/2009 | Fregene |
| 2009/0198371 A1 | 8/2009 | Emanuel et al. |
| 2009/0204261 A1 | 8/2009 | Strand et al. |
| 2009/0222148 A1 | 9/2009 | Knotts et al. |
| 2009/0226035 A1 | 9/2009 | Iihoshi et al. |
| 2009/0245656 A1 | 10/2009 | Hu |
| 2009/0256822 A1 | 10/2009 | Amireh et al. |
| 2009/0257741 A1 | 10/2009 | Greb |
| 2009/0262074 A1 | 10/2009 | Nasiri et al. |
| 2009/0265671 A1 | 10/2009 | Sachs et al. |
| 2009/0278932 A1 | 11/2009 | Yi |
| 2009/0284553 A1 | 11/2009 | Seydoux |
| 2009/0316012 A1 | 12/2009 | Matos |
| 2010/0002909 A1 | 1/2010 | Lefevre et al. |
| 2010/0004798 A1 | 1/2010 | Bodin et al. |
| 2010/0010669 A1 | 1/2010 | Lee et al. |
| 2010/0010672 A1 | 1/2010 | Wang et al. |
| 2010/0032224 A1 | 2/2010 | Liu |
| 2010/0057059 A1 | 3/2010 | Makino |
| 2010/0063652 A1 | 3/2010 | Anderson |
| 2010/0066676 A1 | 3/2010 | Kramer et al. |
| 2010/0084513 A1 | 4/2010 | Gariepy et al. |
| 2010/0090661 A1 | 4/2010 | Chen et al. |
| 2010/0106344 A1 | 4/2010 | Edwards et al. |
| 2010/0145236 A1 | 6/2010 | Greenberg et al. |
| 2010/0169098 A1 | 7/2010 | Patch |
| 2010/0172287 A1 | 7/2010 | Krieter |
| 2010/0178982 A1 | 7/2010 | Ehrman |
| 2010/0183195 A1 | 7/2010 | Sharma |
| 2010/0234993 A1 | 9/2010 | Seelinger et al. |
| 2010/0241289 A1 | 9/2010 | Sandberg |
| 2010/0261526 A1 | 10/2010 | Anderson et al. |
| 2010/0264756 A1 | 10/2010 | Lee et al. |
| 2010/0283988 A1 | 11/2010 | Mosier et al. |
| 2010/0302247 A1 | 12/2010 | Perez et al. |
| 2010/0302359 A1 | 12/2010 | Adams |
| 2010/0305778 A1 | 12/2010 | Dorneich et al. |
| 2010/0305781 A1 | 12/2010 | Felix |
| 2010/0312917 A1 | 12/2010 | Allport |
| 2010/0324753 A1 | 12/2010 | Okumatsu |
| 2011/0003640 A9 | 1/2011 | Ehrman |
| 2011/0018731 A1 | 1/2011 | Linsky et al. |
| 2011/0018794 A1 | 1/2011 | Linsky et al. |

(56) References Cited

U.S. PATENT DOCUMENTS

| | | |
|---|---|---|
| 2011/0022196 A1 | 1/2011 | Linsky et al. |
| 2011/0035054 A1 | 2/2011 | Gal et al. |
| 2011/0050940 A1 | 3/2011 | Lanz et al. |
| 2011/0060492 A1 | 3/2011 | Kaznov |
| 2011/0065488 A1 | 3/2011 | Okamura et al. |
| 2011/0071652 A1 | 3/2011 | Brown et al. |
| 2011/0071702 A1 | 3/2011 | Wang et al. |
| 2011/0082566 A1 | 4/2011 | Herr et al. |
| 2011/0087371 A1 | 4/2011 | Sandberg et al. |
| 2011/0132671 A1 | 6/2011 | Lee et al. |
| 2011/0138416 A1 | 6/2011 | Kang et al. |
| 2011/0153885 A1 | 6/2011 | Mak et al. |
| 2011/0156943 A1 | 6/2011 | Wong et al. |
| 2011/0174565 A1 | 7/2011 | Rochat et al. |
| 2011/0183732 A1 | 7/2011 | Block et al. |
| 2011/0184590 A1 | 7/2011 | Duggan et al. |
| 2011/0201362 A1 | 8/2011 | Bregman-Amitai et al. |
| 2011/0213278 A1 | 9/2011 | Horak et al. |
| 2011/0231013 A1 | 9/2011 | Smoot et al. |
| 2011/0234488 A1 | 9/2011 | Ge et al. |
| 2011/0237324 A1 | 9/2011 | Glavin et al. |
| 2011/0246904 A1 | 10/2011 | Pinto |
| 2011/0249869 A1 | 10/2011 | Stoeffler |
| 2011/0250967 A1 | 10/2011 | Kulas |
| 2011/0249074 A1 | 11/2011 | Cranfill |
| 2011/0273379 A1 | 11/2011 | Chen et al. |
| 2011/0283223 A1 | 11/2011 | Vaittinen et al. |
| 2011/0285349 A1 | 11/2011 | Widmer et al. |
| 2011/0286631 A1 | 11/2011 | Wagner et al. |
| 2011/0291926 A1 | 12/2011 | Gokturk et al. |
| 2011/0294397 A1 | 12/2011 | Tsai |
| 2011/0301901 A1 | 12/2011 | Panagas |
| 2011/0304633 A1 | 12/2011 | Beardsley |
| 2011/0308873 A1 | 12/2011 | Kim et al. |
| 2011/0313568 A1 | 12/2011 | Blackwell et al. |
| 2011/0320153 A1 | 12/2011 | Lightcap |
| 2011/0320830 A1 | 12/2011 | Ito |
| 2012/0009845 A1 | 1/2012 | Schmelzer |
| 2012/0035799 A1 | 2/2012 | Ehrmann |
| 2012/0043149 A1* | 2/2012 | Kim et al. ............ 180/218 |
| 2012/0043172 A1 | 2/2012 | Ichikawa |
| 2012/0059520 A1* | 3/2012 | Kossett ............ 700/264 |
| 2012/0065747 A1 | 3/2012 | Brown et al. |
| 2012/0072023 A1 | 3/2012 | Ota |
| 2012/0083945 A1 | 4/2012 | Oakley et al. |
| 2012/0083962 A1 | 4/2012 | Sato et al. |
| 2012/0099756 A1 | 4/2012 | Sherman et al. |
| 2012/0100915 A1 | 4/2012 | Margalit et al. |
| 2012/0106783 A1 | 5/2012 | Chang et al. |
| 2012/0112553 A1 | 5/2012 | Stoner |
| 2012/0129605 A1 | 5/2012 | Livet |
| 2012/0146775 A1 | 6/2012 | Kudo et al. |
| 2012/0149359 A1 | 6/2012 | Huang |
| 2012/0155724 A1 | 6/2012 | Kitamura |
| 2012/0167014 A1 | 6/2012 | Joo et al. |
| 2012/0168240 A1 | 7/2012 | Wilson |
| 2012/0173018 A1 | 7/2012 | Allen et al. |
| 2012/0173047 A1 | 7/2012 | Bernstein et al. |
| 2012/0173050 A1 | 7/2012 | Bernstein et al. |
| 2012/0185115 A1 | 7/2012 | Dean |
| 2012/0193154 A1 | 8/2012 | Wellborn et al. |
| 2012/0197439 A1 | 8/2012 | Wang et al. |
| 2012/0200380 A1 | 8/2012 | Kocijan |
| 2012/0215355 A1 | 8/2012 | Bewley et al. |
| 2012/0229647 A1 | 9/2012 | Calman et al. |
| 2012/0232977 A1 | 9/2012 | Calman et al. |
| 2012/0233015 A1 | 9/2012 | Calman et al. |
| 2012/0240077 A1 | 9/2012 | Vaittinen et al. |
| 2012/0244969 A1 | 9/2012 | Binder |
| 2012/0258645 A1 | 10/2012 | Cheng |
| 2012/0262002 A1 | 10/2012 | Widmer et al. |
| 2012/0263154 A1 | 10/2012 | Blanchflower et al. |
| 2012/0291926 A1 | 11/2012 | Misra et al. |
| 2012/0293548 A1 | 11/2012 | Perez et al. |
| 2012/0298049 A1 | 11/2012 | Cook et al. |
| 2012/0298430 A1 | 11/2012 | Schroll et al. |
| 2012/0302129 A1 | 11/2012 | Persaud |
| 2012/0306850 A1 | 12/2012 | Balan et al. |
| 2012/0307001 A1 | 12/2012 | Osaka et al. |
| 2012/0309261 A1 | 12/2012 | Boman |
| 2012/0311810 A1 | 12/2012 | Gilbert et al. |
| 2013/0022274 A1 | 1/2013 | Lawrence |
| 2013/0040533 A1 | 2/2013 | Miller |
| 2013/0050069 A1 | 2/2013 | Ota |
| 2013/0065482 A1 | 3/2013 | Trickett |
| 2013/0105239 A1 | 5/2013 | Fung |
| 2013/0109272 A1 | 5/2013 | Rindlisbacher |
| 2013/0113307 A1 | 5/2013 | Kim et al. |
| 2013/0143482 A1 | 6/2013 | Regier |
| 2013/0178257 A1 | 7/2013 | Lengseth |
| 2013/0200207 A1 | 8/2013 | Pongratz |
| 2013/0259386 A1 | 10/2013 | Chadranshekar |
| 2013/0265225 A1 | 10/2013 | Nasiri et al. |
| 2013/0293584 A1 | 11/2013 | Anderson et al. |
| 2013/0307875 A1 | 11/2013 | Anderson et al. |
| 2013/0335301 A1 | 12/2013 | Wong et al. |
| 2014/0008496 A1 | 1/2014 | Ye |
| 2014/0015493 A1 | 1/2014 | Wirz et al. |
| 2014/0051513 A1 | 2/2014 | Polo et al. |
| 2014/0120887 A1 | 5/2014 | Huang |
| 2014/0176487 A1 | 6/2014 | Kikuchi |
| 2014/0207280 A1 | 7/2014 | Duffey |
| 2014/0249697 A1 | 9/2014 | Fredriksson |
| 2014/0371954 A1 | 12/2014 | Lee et al. |
| 2015/0091697 A1 | 4/2015 | Takayasu |
| 2015/0175202 A1 | 6/2015 | MacGregor |
| 2015/0209664 A1 | 7/2015 | Haseltine |
| 2015/0268666 A1 | 9/2015 | Wang et al. |
| 2016/0033967 A1 | 2/2016 | Bernstein et al. |
| 2016/0054734 A1 | 2/2016 | Bernstein et al. |
| 2016/0090133 A1 | 3/2016 | Bernstein et al. |
| 2016/0148367 A1 | 5/2016 | Polo et al. |
| 2016/0202696 A1 | 7/2016 | Bernstein et al. |
| 2016/0246299 A1 | 8/2016 | Berberian et al. |
| 2016/0282871 A1 | 9/2016 | Berstein et al. |
| 2016/0291591 A1 | 10/2016 | Bernstein et al. |
| 2016/0291595 A1 | 10/2016 | Halloran |
| 2016/0349748 A1 | 12/2016 | Bernstein et al. |
| 2017/0080352 A1 | 3/2017 | Bernstein et al. |
| 2017/0092009 A1 | 3/2017 | Polo et al. |
| 2018/0224845 A1 | 8/2018 | Bernstein et al. |
| 2018/0296911 A1 | 10/2018 | Polo et al. |
| 2018/0364699 A1 | 12/2018 | Bernstein et al. |

FOREIGN PATENT DOCUMENTS

| | | |
|---|---|---|
| CN | 101154110 | 4/2008 |
| CN | 201147642 | 11/2008 |
| CN | 201220111 | 4/2009 |
| CN | 101426664 | 5/2009 |
| CN | 102060060 | 5/2011 |
| CN | 102421629 | 4/2012 |
| DE | 19809168 | 9/1999 |
| DE | 101 46 862 A1 | 5/2002 |
| DE | 102011108689 | 4/2012 |
| EP | 371149 | 6/1990 |
| EP | 1944573 | 7/2008 |
| EP | 102010042395 | 4/2012 |
| GB | 03727 | 1/1898 |
| GB | 2309650 | 8/1997 |
| GB | 2319756 | 6/1998 |
| JP | 03182290 A | 8/1991 |
| JP | H07-308462 | 11/1995 |
| JP | 09254838 A | 9/1997 |
| JP | 2000218578 A | 8/2000 |
| JP | 2001153650 | 6/2001 |
| JP | 2002126373 | 5/2002 |
| JP | 2002345706 | 12/2002 |
| JP | 2004042246 | 2/2004 |
| JP | 2004148439 | 5/2004 |
| JP | 2004260917 | 9/2004 |
| JP | 2005165692 | 6/2005 |
| JP | 2007072802 | 3/2007 |
| JP | 2007213353 | 8/2007 |

(56) References Cited

FOREIGN PATENT DOCUMENTS

| | | |
|---|---|---|
| JP | 2008040725 | 2/2008 |
| JP | 2011530756 | 12/2011 |
| JP | 2012022457 | 2/2012 |
| JP | 4893862 | 3/2012 |
| KR | 10-2008-040725 | 8/2008 |
| KR | 10-2008-0073626 | 8/2008 |
| KR | 10-2008-0092595 | 10/2008 |
| KR | 10-2009-0000013 A | 1/2009 |
| KR | 20100001408 | 1/2010 |
| KR | 10-2009-69873 | 7/2010 |
| TW | 20105393 | 4/2010 |
| WO | WO-97/25239 A1 | 7/1991 |
| WO | WO-2006/049559 A1 | 5/2006 |
| WO | 2008008847 | 1/2008 |
| WO | WO-2012/094349 A2 | 7/2012 |
| WO | 2012103525 | 8/2012 |

OTHER PUBLICATIONS

European Search Report and European Search Opinion dated Nov. 6, 2014, for related EP Application No. 12731945.7 filed Jul. 26, 2013. 7 pages.
Non-Final Office Action dated Oct. 16, 2012, for related U.S. Appl. No. 13/342,853, filed Feb. 19, 2013, 10 pages.
Non-Final Office Action dated Apr. 9, 2013, for related U.S. Appl. No. 13/342,892, filed Jan. 3, 2013, 19 pages.
Notification of Transmittal of International Search Report and the Written Opinion of the International Searching Authority dated Dec. 3, 2012, for related PCT Application No. PCT/US2012/020115 filed Jan. 3, 2012, 11 pages.
Non-Final Office Action dated Apr. 16, 2013, for related U.S. Appl. No. 13/342,884, filed Jan. 3, 2013, 20 pages.
Notice of Allowance dated Apr. 19, 2013, for related U.S. Appl. No. 13/342,853, filed Feb. 19, 2013, 11 pages.
Non-Final Office Action dated May 13, 2013, for related U.S. Appl. No. 13/342,874, filed Jan. 3, 2012, 17 pages.
Non-Final Office Action dated Jun. 3, 2013, for related U.S. Appl. No. 13/342,914, filed Jan. 3, 2012, 32 pages.
Koshiyama et al., Machine Translation for JP 2000-218578, Aug. 8, 2000, 11 Pages.
Non-Final Office Action dated Jun. 13, 2013, for related U.S. Appl. No. 13/342,908, filed Jan. 3, 2012, 36 pages.
GearBox Ball Prototype Jun. 29, 2010, Pictures from Video [online]. Orbotix, Inc., Jun. 30, 2010, 91 pages. Retrieved from the internet:<URL: http://www.youtube.com/watch?v=qRBM7bAaXpU>.
Notification of Transmittal of International Search Report and the Written Opinion of the International Searching Authority dated Aug. 28, 2013, for related PCT Application No. PCT/US2013/041023 filed May 14, 2013, 11 pages.
Final Office Action dated Nov. 15, 2013, for related U.S. Appl. No. 13/342,892, filed Jan. 3, 2013, 21 pages.
Final Office Action dated Nov. 18, 2013, for related U.S. Appl. No. 13/342,884, filed Jan. 3, 2013, 19 pages.
Final Office Action dated Nov. 18, 2013, for related U.S. Appl. No. 13/342,874, filed Jan. 3, 2012, 21 pages.
Final Office Action dated Nov. 13, 2013, for related U.S. Appl. No. 13/342,914, filed Jan. 3, 2012, 30 pages.
Non-Final Office Action dated Dec. 20, 2013, for related U.S. Appl. No. 13/342,908, filed Jan. 3, 2012, 28 pages.
Liu, Dalian et al., "Motion Control of a Spherical Mobile Robot by Feedback Linearization," 7th WC on IC&A, Jun. 27, 2008, Chongqing, China, pp. 965-970. 6 pages.
Shu, Guanghui et al., "Motion Control of Spherical Robot Based on Conservation of Angular Momentum," IEEE Intl Conf on Mechatronics & Automation, Aug. 12, Changchun, China, pp. 599-604. 6 pages.
Joshi, Vrunda et al., "Design, modeling and controllability of a spherical mobile robot", 13th Natl Conf on Mechanisms & Machines (NaCoMM07) IISc, Bangalore, India, Dec. 13, 2007, pp. 1-6.
Harmo, Panu et al., "Moving Eye—Interactive Telepresence over Internet with a Ball Shaped Mobile Robot," Automation TechLab, Finland, Oct. 2, 2001. 6 pages. http://automation.tkk.fi/files/tervetaas/MovingEye4.pdf.
Halme, Aarne, et al., "Motion Control of a Spherical Mobile Robot", Helsinki, IEEE AMC '1996, pp. 259-264. 6 pages.
Non-Final Office Action dated Apr. 29, 2013, for related U.S. Appl. No. 13/342,874, filed Jan. 3, 2012, 47 pages.
Final Office Action dated Jun. 6, 2014, for related U.S. Appl. No. 13/342,908, filed Jan. 3, 2012, 32 pages.
Provisional U.S. Appl. No. 61/362,005, Schmelzer, effective filing date Jul. 7, 2010, 10 pages.
Notification of Transmittal of International Search Report and the Written Opinion of the International Searching Authority dated Aug. 26, 2014, for related PCT Application No. PCT/US2014/037013 filed May 6, 2014, 10 pages.
International Search Report and the Written Opinion of the International Searching Authority dated Mar. 2, 2015, for related PCT Application No. PCT/US2014/068606 filed Dec. 4, 2014, 9 pages.
U.S. Appl. No. 13/549,097, Office Action dated Oct. 22, 2015, 20 pages.
U.S. Appl. No. 13/549,097, Office Action dated Oct. 4, 2016, 22 pages.
U.S. Appl. No. 13/766,455, Amendment and Response filed Jul. 15, 2015, 11 pages.
U.S. Appl. No. 13/766,455, Notice of Allowance dated Aug. 20, 2015, 15 pages.
U.S. Appl. No. 13/766,455, Office Action dated Apr. 15, 2015, 9 pages.
U.S. Appl. No. 13/894,247, Amendment and Response filed Aug. 13, 2015, 9 pages.
U.S. Appl. No. 13/894,247, Notice of Allowance dated Oct. 29, 2015, 7 pages.
U.S. Appl. No. 13/894,247, Office Action dated Jun. 12, 2015, 14 pages.
U.S. Appl. No. 14/035,841 Amendment and Response filed Sep. 14, 2015, 12 pages.
U.S. Appl. No. 14/035,841, Notice of Allowance dated Sep. 25, 2015, 5 pages.
U.S. Appl. No. 14/035,841, Notice of Allowance dated Oct. 7, 2016, 2 pages.
U.S. Appl. No. 14/035,841, Notice of Allowance dated Oct. 16, 2016, 2 pages.
U.S. Appl. No. 14/035,841, Office Action dated May 13, 2015, 12 pages.
U.S. Appl. No. 14/054,636, Amendment and Response filed Mar. 17, 2016, 13 pages.
U.S. Appl. No. 14/054,636, Amendment and Response filed Sep. 23, 2016, 14 pages.
U.S. Appl. No. 14/054,636, Notice of Allowance dated Dec. 21, 2016, 8 pages.
U.S. Appl. No. 14/054,636, Office Action dated Jan. 20, 2016, 14 pages.
U.S. Appl. No. 14/054,636, Office Action dated Jun. 24, 2016, 23 pages.
U.S. Appl. No. 14/137,954, Amendment and Response filed Aug. 3, 2015, 14 pages.
U.S. Appl. No. 14/137,954, Amendment and Response filed Feb. 5, 2016, 11 pages.
U.S. Appl. No. 14/137,954, Amendment and Response filed Jun. 6, 2016, 12 pages.
U.S. Appl. No. 14/137,954, Notice of Allowance dated Sep. 26, 2016, 8 pages.
U.S. Appl. No. 14/137,954, Office Action dated May 4, 2015, 26 pages.
U.S. Appl. No. 14/137,954, Office Action dated Nov. 5, 2015, 31 pages.
U.S. Appl. No. 14/137,954, Office Action dated Apr. 12, 2016, 27 pages.
U.S. Appl. No. 14/148,541, Amendment and Response filed Sep. 4, 2015, 14 pages.
U.S. Appl. No. 14/148,541, Notice of Allowance dated Nov. 18, 2015, 11 pages.

(56) References Cited

OTHER PUBLICATIONS

U.S. Appl. No. 14/148,541, Office Action dated Jun. 4, 2015, 18 pages.
U.S. Appl. No. 14/261,288, Amendment and Response filed Nov. 5, 2015, 12 pages.
U.S. Appl. No. 14/261,288, Notice of Allowance dated Nov. 23, 2015, 10 pages.
U.S. Appl. No. 14/261,288, Office Action dated Jul. 7, 2015, 13 pages.
U.S. Appl. No. 14/459,235, Notice of Allowance dated Mar. 6, 2015, 9 pages.
U.S. Appl. No. 14/459,235, Notice of Allowance dated Jun. 25, 2015, 7 pages.
U.S. Appl. No. 14/663,446, Notice of Allowance dated Sep. 25, 2015, 9 pages.
U.S. Appl. No. 14/691,349, Amendment and Response filed Aug. 28, 2015, 11 pages.
U.S. Appl. No. 14/691,349, Amendment and Response filed Jan. 26, 2016, 6 pages.
U.S. Appl. No. 14/691,349, Notice of Allowance dated Mar. 4, 2016, 5 pages.
U.S. Appl. No. 14/691,349, Notice of Allowance dated Jun. 6, 2016, 5 pages.
U.S. Appl. No. 14/691,349, Office Action dated Jul. 17, 2015, 9 pages.
U.S. Appl. No. 14/832,801, Amendment and Response filed Feb. 5, 2016, 10 pages.
U.S. Appl. No. 14/832,801, Amendment and Response filed Feb. 12, 2016, 8 pages.
U.S. Appl. No. 14/832,801, Notice of Allowance dated Mar. 22, 2016, 10 pages.
U.S. Appl. No. 14/832,801, Notice of Allowance dated May 11, 2016, 5 pages.
U.S. Appl. No. 14/832,801, Office Action dated Nov. 6, 2015, 6 pages.
U.S. Appl. No. 14/839,610, Amendment and Response filed Feb. 18, 2016, 11 pages.
U.S. Appl. No. 14/839,610, Notice of Allowance dated Mar. 23, 2016, 16 pages.
U.S. Appl. No. 14/839,610, Office Action dated Nov. 18, 2015, 7 pages.
U.S. Appl. No. 14/850,910, Amendment and Response filed Feb. 18, 2016, 7 pages.
U.S. Appl. No. 14/850,910, Notice of Allowance dated Mar. 17, 2016, 11 pages.
U.S. Appl. No. 14/850,910, Office Action dated Nov. 25, 2015, 8 pages.
U.S. Appl. No. 15/281,478, Office Action dated May 5, 2017, 5 pages.
U.S. Appl. No. 15/232,490, Amendment and Response filed Jul. 10, 2017, 3 pages.
U.S. Appl. No. 15/146,631, Office Action dated May 16, 2017, 11 pages.
U.S. Appl. No. 15/040,331, Amendment and Response filed Jul. 10, 2017, 10 pages.
U.S. Appl. No. 14/884,632, Supplemental Notice of Allowance dated Jun. 1, 2017, 2 pages.
U.S. Appl. No. 14/884,632, Notice of Allowance dated May 15, 2017, 8 pages.
U.S. Appl. No. 13/342,892, Board Decision dated May 5, 2017, 8 pages.
U.S. Appl. No. 13/342,892, Notice of Allowance dated Jun. 7, 2017, 7 pages.
U.S. Appl. No. 13/342,892, Supplemental Notice of Allowance dated Jun. 29, 2017, 2 pages.
U.S. Appl. No. 13/549,097, Office Action dated Jun. 26, 2017, 30 pages.
U.S. Appl. No. 14/054,636, Notice of Allowance dated Jul. 7, 2017, 7 pages.
U.S. Appl. No. 14/137,954, Notice of Allowance dated Jun. 29, 2017, 8 pages.
European Extended Search Report in Application 14795148.7, dated Apr. 5, 2017, 12 pages.
Chinese Office Action in Application 201380036857.2, dated Mar. 22, 2017, 11 pages.
Japanese Office Action in Application 2015-521853, dated Feb. 14, 2017, 6 pages.
Chinese Office Action in Application 201620300686.0, dated Feb. 3, 2016, 5 pages.
Chinese Office Action in Application 201702030180700, dated Feb. 7, 2017, 8 pages.
Japanese Office Action in Application 2015-512768, dated Dec. 6, 2016, 9 pages.
PCT International Preliminary Report on Patentability in PCT/US2015/030877, dated Feb. 23, 2017, 5 pages.
PCT International Preliminary Report on Patentability in PCT/US2015/044885, dated Feb. 23, 2017, 5 pages.
U.S. Appl. No. 14/054,636, Notice of Allowance dated Mar. 1, 2017, 7 pages.
U.S. Appl. No. 15/232,490, Amendment and Response filed Feb. 22, 2017, 3 pages.
Chinese Office Action in Application 201480029695.4, dated May 27, 2017, 22 pages.
Chinese Office Action in Application 201510463007.1, dated May 31, 2017, 8 pages.
Chinese Office Action in Application 201620300686, dated May 2, 2017, 2 pages. (No English Translation).
European Extended Search Report in Application 14853882.0, dated Jun. 22, 2017, 6 pages.
European Office Action in Application 13817383.8, dated Apr. 20, 2017, 6 pages.
Korean Office Action in Application 10-2014-7034020, dated Jun. 30, 2017, 11 pages.
"Roll, Pitch, and Yaw, How Things Fly", How Things Fly website, https://howthingsfly.si.edu/flight-dynamics/roll-pitch-and-yaw.
Arioiu, "Force Feedback Stabilization for Remote Control of an Assistive Mobile Robot", AACC Publication, 2011, pp. 4898-4903.
Chinese Office Action in Application 201380036857.2, dated Jun. 29, 2016, 10 pages.
Chinese Office Action in Application 201620300686, dated Sep. 9, 2016, 3 pages.
Diolaiti et al., "Tele-operation of a Mobile Robot Through Haptic Feedback", IEEE, 2002, p. 1-6.
European Search Report in Application 13817382.2, dated Mar. 11, 2016, 8 pages.
Hashimoto et al., "TouchMe: An Augmented Reality Based Remote Robot Manipulation", Nov. 2011, pp. 61-66.
Korean Office Action in Application 10-2015-7003642, dated Nov. 28, 2016, 13 pages.
Osorio et al., "Mobile Robots Design and Implementation: From Virtual Simulation to Real Robots", IDME Publication, 2010, 6 pages.
PCT International Search Report in PCT/US2013/050327, dated Oct. 15, 2013, 11 pages.
PCT International Search Report in PCT/US2014/037013, dated Aug. 26, 2014, 8 pages.
PCT International Search Report in PCT/US2014/059973, dated Dec. 17, 2014, 11 pages.
PCT International Search Report in PCT/US2015/030877, dated Aug. 13, 2015, 5 pages.
PCT International Search Report in PCT/US2015/044885, dated Oct. 29, 2015, 7 pages.
Simsarian et al., "Achieving Virtual Presence with a Semi-autonomous Robot through a Multi-reality and speech control interface", 1996, pp. 50-63.
U.S. Appl. No. 13/342,853, Amendment and Response filed Feb. 19, 2013, 7 pages.
U.S. Appl. No. 13/342,853, Notice of Allowance dated Jun. 20, 2013, 6 pages.
U.S. Appl. No. 13/342,874, Amendment and Response filed Sep. 13, 2013, 21 pages.

(56) References Cited

OTHER PUBLICATIONS

U.S. Appl. No. 13/342,874, Amendment and Response filed Jan. 21, 2014, 13 pages.
U.S. Appl. No. 13/342,874, Amendment and Response filed Jul. 14, 2014, 13 pages.
U.S. Appl. No. 13/342,874, Amendment and Response filed Mar. 5, 2015, 11 pages.
U.S. Appl. No. 13/342,874, Amendment and Response filed Jul. 7, 2015, 9 pages.
U.S. Appl. No. 13/342,874, Notice of Allowance dated Jul. 24, 2015, 18 pages.
U.S. Appl. No. 13/342,874, Notice of Allowance dated Aug. 11, 2015, 3 pages.
U.S. Appl. No. 13/342,874, Office Action dated Sep. 4, 2014, 16 pages.
U.S. Appl. No. 13/342,874, Office Action dated Apr. 7, 2015, 8 pages.
U.S. Appl. No. 13/342,884, Amendment and Response filed Sep. 16, 2013, 32 pages.
U.S. Appl. No. 13/342,884, Amendment and Response filed Jan. 21, 2014, 11 pages.
U.S. Appl. No. 13/342,884, Notice of Allowance dated Feb. 19, 2014, 14 pages.
U.S. Appl. No. 13/342,892, Amendment and Response filed Sep. 9, 2013, 27 pages.
U.S. Appl. No. 13/342,892, Amendment and Response filed Feb. 18, 2014, 12 pages.
U.S. Appl. No. 13/342,892, Appeal Brief filed Jul. 17, 2014, 30 pages.
U.S. Appl. No. 13/342,892, Response to Appeal Brief dated Aug. 6, 2014, 16 pages.
U.S. Appl. No. 13/342,908, Advisory Action dated Aug. 11, 2014, 3 pages.
U.S. Appl. No. 13/342,908, Advisory Action dated Sep. 18, 2014, 4 pages.
U.S. Appl. No. 13/342,908, Amendment and Response filed Oct. 15, 2013, 32 pages.
U.S. Appl. No. 13/342,908, Amendment and Response filed Mar. 20, 2014, 21 pages.
U.S. Appl. No. 13/342,908, Amendment and Response filed Aug. 4, 2014, 13 pages.
U.S. Appl. No. 13/342,908, Amendment and Response filed Sep. 5, 2014, 18 pages.
U.S. Appl. No. 13/342,908, Amendment and Response filed Apr. 6, 2015, 12 pages.
U.S. Appl. No. 13/342,908, Notice of Allowance dated Apr. 29, 2015, 12 pages.
U.S. Appl. No. 13/342,908, Supplemental Amendment and Response filed Apr. 17, 2015, 10 pages.
U.S. Appl. No. 13/342,914, Advisory Action dated Feb. 13, 2014, 3 pages.
U.S. Appl. No. 13/342,914, Amendment and Response filed Sep. 3, 2013, 24 pages.
U.S. Appl. No. 13/342,914, Amendment and Response filed Feb. 3, 2014, 12 pages.
U.S. Appl. No. 13/342,914, Appeal Brief filed Jul. 3, 2014, 27 pages.
U.S. Appl. No. 13/342,914, Response to Appeal Brief dated Jul. 29, 2014, 10 pages.
U.S. Appl. No. 13/549,097, Amendment and Response filed Mar. 24, 2015, 14 pages.
U.S. Appl. No. 13/549,097, Amendment and Response filed Jan. 22, 2016, 16 pages.
U.S. Appl. No. 13/549,097, Office Action dated Dec. 26, 2014, 20 pages.
U.S. Appl. No. 15/232,490, Notice of Allowance dated Sep. 21, 2017, 7 pages.
U.S. Appl. No. 15/146,631, Office Action dated Sep. 21, 2017, 14 pages.
U.S. Appl. No. 13/549,097, Advisory Action dated Sep. 22, 2017, 2 pages.
U.S. Appl. No. 13/342,892, Supplemental Notice of Allowance dated Jul. 26, 2017, 2 pages.
U.S. Appl. No. 13/549,097, Amendment and Response filed Aug. 25, 2017, 11 pages.
U.S. Appl. No. 14/054,636, Supplemental Notice of Allowance dated Aug. 2, 2017, 4 pages.
U.S. Appl. No. 14/137,954, Supplemental Notice of Allowance dated Jul. 27, 2017, 2 pages.
U.S. Appl. No. 14/884,632, Supplemental Notice of Allowance dated Jul. 28, 2017, 2 pages.
U.S. Appl. No. 15/040,331, Notice of Allowance dated Aug. 1, 2017, 9 pages.
U.S. Appl. No. 15/146,631, Amendment and Response filed Aug. 18, 2017, 10 pages.
U.S. Appl. No. 15/177,809, Office Action dated Aug. 16, 2017, 6 pages.
U.S. Appl. No. 15/180,485, Office Action dated Aug. 17, 2017, 9 pages.
U.S. Appl. No. 15/232,490, Notice of Allowance dated Aug. 10, 2017, 5 pages.
U.S. Appl. No. 15/281,478, Amendment and Response filed Sep. 5, 2017, 8 pages.
Wright's Brothers Propulsion System, Smithsonian national Air and Museum, retrieved , retreived Aug. 17, 2017, https://airandspace.si.edu/exhibitions/wright-brothers/online/fly/1903/propulsion.cfm, 5 pages.
Airplane Flying Handbook (FAA-H-8083-3B) Chapter 10, Figure, 10-2, https://www.faa.gov/regulations_policies/handbooks_manuals/aviation/airplane_handbook/media/12_afh_ch10.pdf, 10 pages, 2004, 10 pages.
Randall Munroe, New Pet, http://xkcd.com/413/, Retrieved from Internet Archive (http://web.archive.org/web/20080701080435/http://xkcd.com/413/) (2008), Retrieved on Apr. 13, 2017, 3 pages.
Curriculum of Dr. Jason Janet cited in IPR2017-01272, filed Apr. 20, 2017, 6 pages.
Declaration of Dr. Jason Janet cited in IPR2017-01272, filed Apr. 20, 2017, 79 pages.
Xialing Lv and Minglu Zhang, Robot Control Based on Voice Command, IEEE International Conference on Automation and Logistics 2490, 2008, 5 pages.
Gene F. Franklin, J. David Powell, Abbas Emami-Naeini, Feedback Control of Dynamic Systems, Fourth Edition, Prentice Hall, 2002, 28 pages.
Hashem Ghariblu and Hadi Mohammadi, Structure and Dynamic Modeling of a Spherical Robot, 8th International Symposium on Mechatronics and its Applications, 2012, 5 pages.
Hiroyuki Fujita, A Decade of MEMS and its Future, Proceedings IEEE The Tenth Annual International Workshop on Micro Electro Mechanical Systems, 1997, 8 pages.
How a Small Robotics Startup Helped Disney Bring BB-8 to Life, US Chamber of Commerce (https://www.uschamber.com/above-thefold/how-small-robotics-startup-helped-disney-bring-bb-8-life), Retrieved on Mar. 31, 2017, 6 pages.
Qiang Zhan, Yao Cai, and Caixia Yan, Design, Analysis and Experiments of an Omni-Directional Spherical Robot, IEEE International Conference on Robotics and Automation 4921, 2011, 6 pages.
Martyn Williams, Sony unwraps high-tech 'healing' ball, CNN.com, published Mar. 28, 2002, http://edition.cnn.com/2002/TECH/ptech/03/28/robodex.healing.ball.idg/?related, retreived on Apr. 4, 2017, 1 page.
Masato Ishikawa, Ryohei Kitayoshi, and Toshiharu Sugie, Dynamic rolling locomotion by spherical mobile robots considering its generalized momentum, Proceedings of SICE Annual Conference 2010 2311 (2010), 6 pages.
Meet BB-8: The New Droid in the Lives of Star Wars Buffs, Wharton School of the University of Pennsylvania (Nov. 13, 2015) (http://knowledge.wharton.upenn.edu/article/meet-bb-8-the-newdroid- in-the-lives-of-star-wars-buffs/), Retrieved on Mar. 31, 2017, 3 pages.

(56) References Cited

OTHER PUBLICATIONS

Petition for Inter Parties Review of U.S. Pat. No. 9,211,920, filed Apr. 20, 2017, 75 pages.
U.S. Appl. No. 15/232,490, Office Action dated Mar. 17, 2017, 4 pages.
U.S. Appl. No. 15/040,331, Office Action dated Apr. 13, 2017, 10 pages.
U.S. Appl. No. 13/549,097, Amendment and Response filed Mar. 14, 2017, 13 pages.
U.S. Appl. No. 14/137,954, Notice of Allowance dated Mar. 8, 2017, 8 pages.
U.S. Appl. No. 14/884,632, Amendment and Response filed Apr. 19, 2017, 3 pages.
U.S. Appl. No. 14/933,827, Office Action dated Apr. 21, 2017, 7 pages.
Chinese Notice of Allowance in Application 201380036857.2, dated Aug. 1, 2017, 4 pages.
Chinese Office Action in Application 201510463336.6, dated Jul. 17, 2017, 5 pages. (No English Translation).
Korean Notice of Allowance in Application 10-2015-7003642, dated Jul. 25, 2017, 4 pages.
U.S. Appl. No. 14/968,594, Amendment and Response filed Apr. 5, 2016, 7 pages.
U.S. Appl. No. 14/968,594, Notice of Allowance dated Jul. 19, 2016, 6 pages.
U.S. Appl. No. 14/968,594, Office Action dated Feb. 3, 2016, 5 pages.
U.S. Appl. No. 14/975,510, Amendment and Response filed May 12, 2016, 8 pages.
U.S. Appl. No. 14/975,510, Notice of Allowance dated Jul. 7, 2016, 5 pages.
U.S. Appl. No. 14/975,510, Office Action dated Feb. 12, 2016, 6 pages.
U.S. Appl. No. 15/017,211, Notice of Allowance dated Jul. 5, 2016, 10 pages.
U.S. Appl. No. 15/017,211, Notice of Allowance dated Aug. 8, 2016, 4 pages.
U.S. Appl. No. 15/232,490, Office Action dated Sep. 23, 2016, 5 pages.
European Search Report in Application 13790911.5, dated Oct. 14, 2016, 10 pages.
Loy et al., "Fast Radial Symmetry for Detecing Points of Interest", IEEE Transactions on Pattern Analysis and Machine Intelligence, IEEE Computer Society, USA, vol. 25, No. 8, Aug. 1, 2003, 15 pages.
European Search Report in Application 14795148.7, dated Dec. 7, 2016, 7 pages.
Korean Office Action in Application 10-2014-7034020, dated Dec. 23, 2016, 11 pages.
U.S. Appl. No. 14/884,632, Office Action dated Jan. 25, 2017, 7 pages.
U.S. Appl. No. 13/342,914, Decision on Appeal dated Feb. 1, 2017, 8 pages.
U.S. Appl. No. 15/281,409, Office Action dated Jul. 6, 2018, 19 pages.
U.S. Appl. No. 15/180,485, Notice of Allowance dated Jun. 4, 2018, 2 pages.
U.S. Appl. No. 15/010,337, Amendment and Response filed May 22, 2018, 10 pages.
U.S. Appl. No. 15/146,631, Notice of Allowance dated Aug. 15, 2018, 5 pages.
A. Milelle et al., "Model-Based Relative Localization for Cooperative Robots Using Stero Vision", Dec. 3, 2005, https://infoscience.epfi.ch/record/97591/files/Model-Based_Relative_Localization_MILELLA05.pdf.
European Office Action in Application 13790911.5, dated Jan. 26, 2018, 7 pages.
U.S. Appl. No. 145146,631, Office Action dated Feb. 2, 2018, 12 pages.
U.S. Appl. No. 15/146,631, Advisory Action dated Apr. 23, 2018, 2 pages.
U.S. Appl. No. 14/933,827, Amendment and Response filed Dec. 18, 2017, 6 pages.
U.S. Appl. No. 15/010,337, Office Action dated Dec. 22, 2017, 12 pages.
U.S. Appl. No. 15/146,631, Amendment and Response filed Dec. 18, 2017, 9 pages.
U.S. Appl. No. 15/281,478, Amendment and Response filed Jan. 29, 2018, 8 pages.
U.S. Appl. No. 15/281,478, Office Action dated Dec. 15, 2017, 6 pages.
U.S. Appl. No. 15/177,809, Notice of Allowance dated Dec. 12, 2017, 8 pages.
U.S. Appl. No. 15/180,485, Amendment and Response filed Dec. 22, 2017, 8 pages.
U.S. Appl. No. 15/180,485, Notice of Allowance dated Jan. 26, 2018, 10 pages.
Chinese Notice of Allowance in Application 201510463336.6, dated Nov. 17, 2017, 4 pages.
European Office Action in Application 12731845.7, dated Oct. 25, 2017, 6 pages.
European Office Action in Application 13817382.8, dated Nov. 14, 2017, 5 pages.
Japanese Office Action in 2015-512768, dated Sep. 26, 2017, 10 pages.
Japanese Office Action in Application 2015-521853, dated Oct. 31, 2017, 6 pages.
U.S. Appl. No. 13/549,097, Amendment and Response filed Oct. 24, 2017, 11 pages.
U.S. Appl. No. 14/271,203, Office Action dated Oct. 18, 2017, 13 pages.
U.S. Appl. No. 14/933,827, Amendment and Response filed Oct. 20, 2017, 6 pages.
U.S. Appl. No. 14/933,827, Office Action dated Nov. 22, 2017, 8 pages.
U.S. Appl. No. 15/177,809, Amendment and Response filed Nov. 17, 2017, 7 pages.
U.S. Appl. No. 15/180,485, Amendment and Response filed Nov. 17, 2017, 11 pages.
U.S. Appl. No. 15/180,485, Office Action dated Dec. 7, 2017, 9 pages.
U.S. Appl. No. 15/281,478, Notice of Allowance dated Feb. 22, 2018, 8 pages.
Chinese Notice of Allowance in Application 201510463007.1, dated Mar. 5, 2018, 6 pages.
Chinese Office Action in Application 201480029695.4, dated Feb. 23, 2018, 14 pages.
European Search Report in Application 15831882.4, dated Mar. 1, 2018, 16 pages.
U.S. Appl. No. 15/177,809, Supplemental Notice of Allowance dated Mar. 15, 2018, 2 pages.
U.S. Appl. No. 15/177,809, Supplemental Notice of Allowance dated Mar. 21, 2018, 2 pages.
U.S. Appl. No. 15/180,485 Supplemental Notice of Allowance dated Mar. 15, 2018, 2 pages.
U.S. Appl. No. 14/933,827, Amendment and Response filed Mar. 29, 2018, 6 pages.
U.S. Appl. No. 13/549,097, Notice of Allowance dated Apr. 18, 2018, 12 pages.
U.S. Appl. No. 14/933,827, Office Action dated May 10, 2018, 7 pages.
European Extended Search Report in Application 15831882.4, dated Jun. 13, 2018, 13 pages.
European Office Action in Application 13817382.8, dated Aug. 3, 2018, 4 pages.
U.S. Appl. No. 14/933,827, Amendment and Response filed Sep. 10, 2018, 7 pages.
U.S. Appl. No. 15/010,337, Notice of Allowance dated Sep. 11, 2018, 17 pages.
U.S. Appl. No. 15/822,676, Office Action dated Nov. 30, 2018, 27 pages.

(56) References Cited

OTHER PUBLICATIONS

U.S. Appl. No. 15/888,354, Office Action dated Oct. 5, 2018, 13 pages.
U.S. Appl. No. 14/933,827, Notice of Allowance dated Nov. 16, 2018, 6 pages.
U.S. Appl. No. 15/146,631, Notice of Allowance dated Oct. 11, 2018, 2 pages.
European Office Action in Application 14795148.7, dated Oct. 4, 2018, 7 pages.
U.S. Appl. No. 15/281,409, Amendment and Response filed Jan. 7, 2019, 16 pages.
U.S. Appl. No. 15/888,354, Amendment and Response filed Jan. 4, 2019, 6 pages.
U.S. Appl. No. 14/933,827, Notice of Allowance dated Dec. 18, 2018, 2 pages.
Chinese Notice of Allowance in 201480029695.4, dated Jan. 15, 2019, 4 pages.
Chinese Office Action in 201580055348.3, dated Dec. 5, 2018, 17 pages.

\* cited by examiner

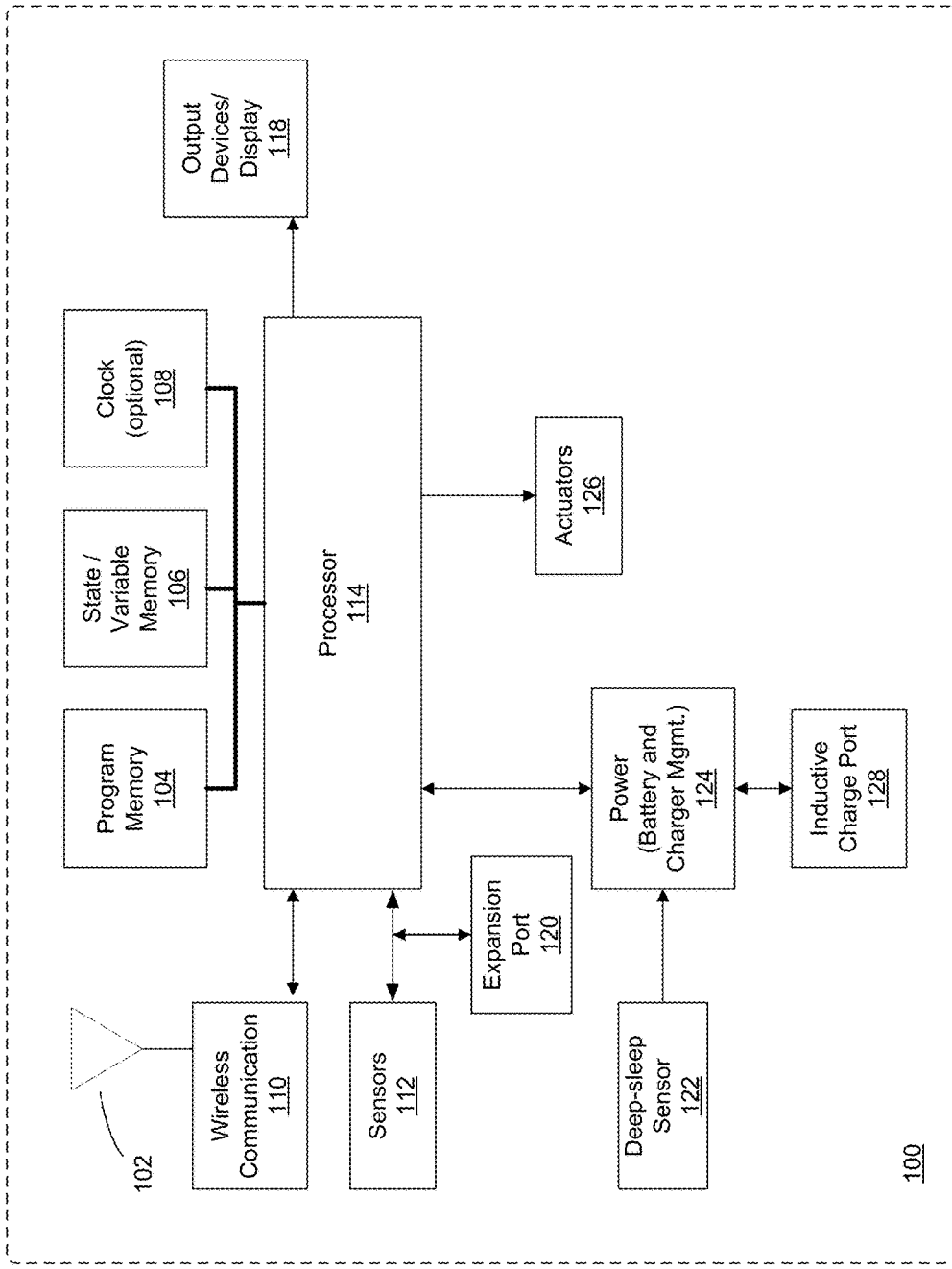

MULTI-PURPOSED SELF-PROPELLED DEVICE

RELATED APPLICATION

This application claims priority to U.S. Provisional Patent Application Ser. No. 61/820,109, entitled, "MULTI-PURPOSED SELF-PROPELLED DEVICE," filed May 6, 2013; the aforementioned application being hereby incorporated by reference in its entirety.

This application is a Continuation-in-Part of U.S. patent application Ser. No. 14/035,841, entitled "SELF-PROPELLED DEVICE WITH ACTIVELY ENGAGED DRIVE SYSTEM", filed Sep. 24, 2013; which is a Continuation of Ser. No. 13/342,853, entitled "SELF-PROPELLED DEVICE WITH ACTIVELY ENGAGED DRIVE SYSTEM", filed Jan. 3, 2012, now U.S. Pat. No. 8,571,781, issued Oct. 29, 2013; which claims benefit of priority to the following: U.S. Provisional Application No. 61/430,023, entitled "METHOD AND SYSTEM FOR CONTROLLING A ROBOTIC DEVICE, filed Jan. 5, 2011; U.S. Provisional Application No. 61/430,083, entitled "SYSTEM AND METHOD FOR ESTABLISHING 2-WAY COMMUNICATION FOR CONTROLLING A ROBOTIC DEVICE", filed Jan. 5, 2011 and U.S. Provisional Application No. 61/553,923, entitled "A SELF-PROPELLED DEVICE AND SYSTEM FOR CONTROLLING SAME", filed Oct. 31, 2011; all of the aforementioned priority applications being hereby incorporated by reference in their respective entirety for all purposes.

TECHNICAL FIELD

Examples described herein relate to a multi-purpose remotely controllable self-propelled device.

BACKGROUND

Various types of remotely controllable devices exist. For example hobbyists often operate remote controlled devices in the form of cars, trucks, airplanes and helicopters. Such devices typically receive commands from a controller device, and after movement (e.g., direction or velocity) based on the input. Some devices use software-based controllers, which can be implemented in the form of an application running on a device such as a smart phone or a tablet.

BRIEF DESCRIPTION OF THE DRAWINGS

The disclosure herein is illustrated by way of example, and not by way of limitation, in the figures of the accompanying drawings in which like reference numerals refer to similar elements, and in which:

FIG. 1 is an example block diagram illustrating the components of a self-propelled device that is in the form of a spherical ball;

DETAILED DESCRIPTION

Figure 2A:
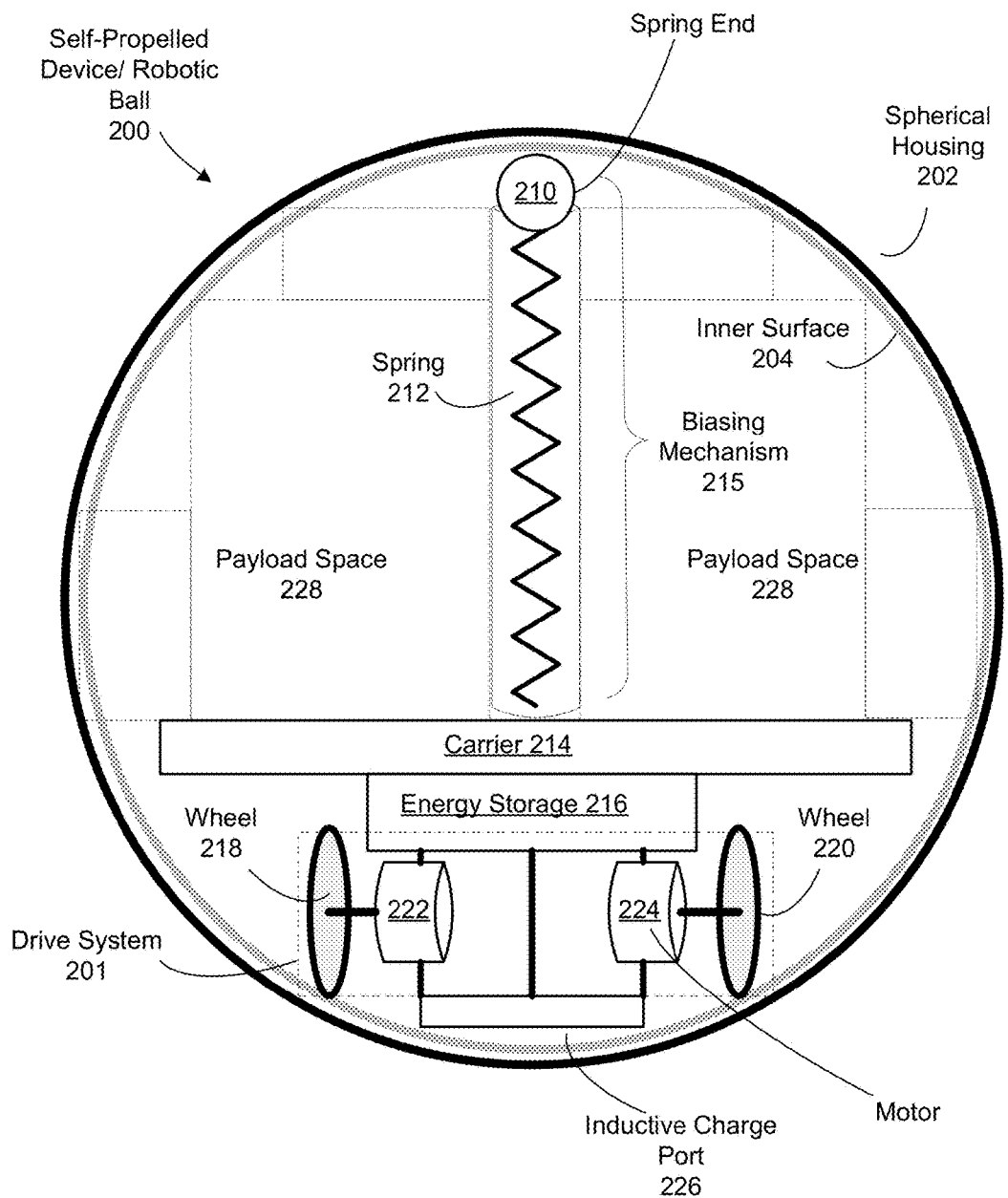
FIG. 2A is an example block diagram illustrating a self-propelled device.

A multi-purposed self-propelled device is provided which includes a drive system, a spherical housing, a biasing mechanism, and a payload space within the spherical housing. The biasing mechanism can include single extended spring to engage an inner surface of the spherical housing diametrically opposed to a contact surface engaged by the drive system. Alternatively, the biasing mechanism can include one or more (e.g., a pair) of portal axles each having a spring and contact element to push against a respective contact point in the inner surface of the spherical housing. As such, the portal axles can produce a vertical force that similarly actively forces the drive system to continuously engage the inner surface of the spherical housing in order to cause the spherical housing to move. The self-propelled device can be implemented to carry a payload or multiple payloads for various uses and activities.

The payload space can be utilized to carry any payload. For example, the payload can include a camera, which can send images and/or a video stream from the self-propelled device to a controller device. The controller device can be in the form of a smartphone, tablet, or any other suitable operating device. Further, the spherical housing can be transparent to allow the camera to take images or real time video, thereby allowing a user of the controller device (e.g. smartphone) to control the self-propelled device by viewing the video stream.

In still other variations, the payload space includes a single payload or multiple payloads for civilian or military use. Such payloads can include one or more of: a camera, an infrared sensor, a chemical sensor, a biological sensor, one or more explosives, a listening device, or any other payload that can fit within the payload space.

For variations including a camera or other image capturing device, a touch a drive method is disclosed that provides the user with the ability to dynamically control the self-propelled device by touching location points on a live image or video feed. The method includes receiving an image or live video feed from the self-propelled device that provides a field of view of the camera mounted within the self-propelled device. This video feed can be displayed on a touch-sensitive display of the controlled or mobile computing device. The method further includes receiving, on the touch-sensitive display, a user selection of a location point within the field of view of the camera, and based on the user selection, generating a command signal to be transmitted to the self-propelled device instructing the self-propelled device to maneuver to the location point.

Furthermore, the method can include determining a position of the location point in the field of view based on a first reference frame of the field of view as displayed on the controller device, and mapping the position of the location point on a second reference frame corresponding to the location point relative to the self-propelled device. In such arrangements, the command signal is generated to include instructions for maneuvering the self-propelled device based solely on the second reference frame. Further still, for live video feed implementations, the controller device can generate the command signal dynamically in conjunction with receiving the live video feed.

System Overview

Referring to the drawings, FIG. 1 is an example block diagram illustrating the components of a self-propelled device that is in the form of a spherical ball. A multipurposed self-propelled device 100 can be operated to move under control of another device, such as a computing device (e.g. a smartphone, tablet, and/or remote control) operated by a user. The self-propelled device 100 can be configured with resources that enable one or more of the following: (i) maintain self-awareness of orientation and/or position relative to an initial reference frame after the device initiates movement; (ii) process control input programmatically, so as to enable a diverse range of program-specific responses to different control inputs; (iii) enable another device to control its movement using software or programming logic that is communicative with programming logic on the self-propelled device; and/or (iv) generate an output response for its movement and state that it is software interpretable by the control device.

For example, the multi-purposed self-propelled device 100 can include several interconnected subsystems and modules. A processor 114 executes programmatic instructions from a program memory 104. The instructions stored in the program memory 104 can be changed, for example to add features, correct flaws, or modify behavior. In some examples, the program memory 104 stores programming instructions that are communicative or otherwise operable with software executing on a computing device. The processor 114 can be configured to execute different programs of programming instructions, in order to after the manner in which the self-propelled device 100 interprets or otherwise responds to control input from another computing device.

A wireless communication module 110, in conjunction with a communication transducer 102, can serve to exchange data between processor 114 and other external devices. The data exchanges, for example, can provide communications, provide control, provide logical instructions, state information, and/or provide updates for the program memory 104. In some examples, the processor 114 can generate output corresponding to state and/or position information, that can then be communicated to the controller device via a wireless communication port. The mobility of the device makes wired connections undesirable. Therefore, the term "connection" can be understood to describe a logical link made without a physical attachment to the self-propelled device 100.

In some examples, the wireless communication module 110 can implement a BLUETOOTH communications protocol and the transducer 102 can be an antenna suitable for transmission and reception of BLUETOOTH signals. As an addition or alternative, the wireless communication module 110 can implement a Wi-Fi communications protocol and the transducer can be an antenna suitable for transmission and reception of Wi-Fi signals. In such examples, the self-propelled device 100 can be controlled by a controller device via BLUETOOTH and/or Wi-Fi signals. Other wireless communication mediums and protocols can also be used in alternative implementations.

Sensors 112 can provide information about the surrounding environment and condition to the processor 114. In variations, the sensors 112 include inertial measurement devices, including a three-axis gyroscope, a three-axis accelerometer, and a three-axis magnetometer. Furthermore, the sensors 112 can provide input to enable the processor 114 to maintain awareness of the device's orientation and/or position relative to the initial reference frame after the device initiates movement. The sensors 112 can include instruments for detecting light, temperature, humidity, or measuring chemical concentrations or radioactivity.

State/variable memory 106 can store information about the state of the device, including, for example, position, orientation, rates of rotation and translation in each axis. The state/variable memory 106 can also store information corresponding to an initial reference frame of the device upon, for example, the device being put in use (e.g., the device being activated), as well as position and orientation information once the device is in use. In this manner, the self-propelled device 100 can utilize information of the state/variable memory 106 in order to maintain position and orientation information of the self-propelled device 100 once the device is in operation.

A clock 108 can provide timing information to the processor 114. For example, the clock 108 can provide a time base for measuring intervals and rates of change. Furthermore, the clock 108 can provide day, date, year, time, and alarm functions. Further still, the clock 108 can allow the self-propelled device 100 to provide an alarm or alert at pre-set times.

An expansion port 120 can provide a connection for addition of accessories or devices. Expansion port 120 provides for future expansion, as well as flexibility to add options or enhancements. For example, expansion port 120 can be used to add peripherals, sensors, processing hardware, storage, displays, or actuators to the self-propelled device 100.

As an addition or alternative, the expansion port 120 can provide an interface capable of communicating with a suitably configured component using analog or digital signals. The expansion port 120 can provide electrical interfaces and protocols that are standard or well-known. The expansion port 120 can further implement an optical interface. For example, interfaces appropriate for expansion port 120 include a Universal Serial Bus (USB), Inter-Integrated Circuit Bus (I2C), Serial Peripheral Interface (SPI), or ETHERNET.

A display 118 presents information to outside devices or persons. The display 118 can present information in a variety of forms. In various examples, the display 118 can produce light in colors and patterns, sound, vibration, or combinations of sensory stimuli. In some examples, the display 118 can operate in conjunction with actuators 126 to communicate information by physical movements of the self-propelled device 100. For example, the self-propelled device 100 can be made to emulate a human head nod or shake to communicate "yes" or "no."

As an addition or alternative, the display 118 can be configured to emit light, either in the visible or invisible range. Invisible light in the infrared or ultraviolet range can be useful, for example, to send information invisible to human senses but available to specialized detectors. Furthermore, the display 118 can include an array of Light Emitting Diodes (LEDs) emitting various light frequencies, arranged such that their relative intensity can be variable and the light emitted can be blended to form color mixtures.

As an addition or alternative, the display 118 includes an LED array comprising several LEDs, each emitting a human-visible primary color. The processor 114 can vary the relative intensity of each LED to produce a wide range of colors. Primary colors of light are those wherein a few colors can be blended in different amounts to produce a wide gamut of apparent colors. Many sets of primary colors of light are known, including for example red/green/blue, red/green/blue/white, and red/green/blue/amber. For example, red, green, and blue LEDs together comprise a usable set of three available primary-color devices comprising the display 118. In variations, other sets of primary colors and white LEDs can be used. In many implementations, the display 118 can include one or more LEDs used to indicate a reference point on the self-propelled device 100 for alignment.

An energy storage unit 124 stores energy for operating the electronics and electromechanical components of the self-propelled device 100. For example, the energy storage unit 124 can be a rechargeable battery. An inductive charge port 128 can allow for recharging the energy storage unit 124 without a wired electrical connection. Furthermore, inductive charge port 128 can receive magnetic energy and convert it to electrical energy to recharge the energy storage unit 124. As an addition or alternative, the inductive charge port 128 can provide a wireless communication interface with an external charging device. Further, a plug in charging means can be included as an addition or alternative to the inductive charge port 128.

A deep sleep sensor 122 can be included to place the self-propelled device 100 into a very low power or "deep sleep" mode where most of the electronic devices use no power. This may useful for long-term storage, shipping, and/or certain implementations of the self-propelled device 100 that require such a state. For example, the self-propelled device 100 can be implemented to carry a payload, such as a camera, a motion sensor, an infrared sensor and/or a chemical or biological sensor. In such variations, the self-propelled device 100 can sit dormant in the deep sleep mode until a trigger, such as an event setting off the camera or one or more sensors, automatically activates the self-propelled device 100.

In variations, the sensors 122 can sense objects, events, incidents, matter, and/or phenomena through the spherical housing of self-propelled device 100 without a wired connection. As an addition or alternative, the deep sleep sensor 122 may be a Hall Effect sensor mounted in a manner such that an external magnet can be applied on the self-propelled device 100 to activate the deep sleep mode.

The drive system actuators 126 can convert electrical energy into mechanical energy for various uses. A primary use of the actuators 126 can be to propel and steer the self-propelled device 100. Movement and steering actuators can also be referred to as a drive system or traction system. The drive system causes rotational and translational movement of the self-propelled device 100 under control of the processor 114. Examples of the actuators 126 can include, for example, wheels, motors, solenoids, propellers, paddle wheels, and pendulums.

For example, the drive system actuators 126 can include a set of two parallel wheels, each mounted to an axle connected to independently variable-speed motors through a reduction gear system. In such examples, the operation of the two independently operated drive motors can be controlled by processor 114.

However, the actuators 126 may produce a variety of movements in addition to rotating and translating self-propelled device 100. For example, the actuators 126 can cause self-propelled device 100 to execute communicative movements, including emulation of human gestures, for example, head nodding, shaking, trembling, spinning or flipping. In variations, the processor coordinates the actuators 126 with the display 118. Similarly, the processor 114 can provide signals to the actuators 126 and the display 118 to cause the self-propelled device 100 to spin or tremble and simultaneously emit patterns of colored light. As an addition or alternative, the self-propelled device 100 can emit light or sound patterns synchronized with movements.

The self-propelled device 100 can be used as a controller for other network-connected devices. The self-propelled device 100 can contain sensors and wireless communication capabilities, so that it may perform a controller role for other devices. For example, the self-propelled device 100 may be held in the hand and used to sense gestures, movements, rotations, combination inputs and the like.

Mechanical Design

FIG. 2A is an example block diagram illustrating a self-propelled device. The self-propelled device 200 can be multi-purposed and can include a spherical housing 202, a drive system 201, a biasing mechanism 215, and a payload space 228. For example, the self-propelled device 200 may be in the form of a robotic, spherical ball. The self-propelled device 200 can be of a size and weight allowing it to be easily grasped, lifted, and carried in an adult human hand. In variations, the self-propelled device 200 may be larger or smaller, and/or customized for a particular payload. For example, the self-propelled device 200 may be manufactured to include a transparent spherical housing, and a camera may be included within the payload space to provide a video stream to the controller device, such as for example as smartphone or tablet, as shown by an example of FIG. 3.

Referring still to FIG. 2A, the self-propelled device 200 includes an outer spherical shell (or housing) 202 that makes contact with an external surface as the device rolls. In addition, the self-propelled device 200 includes an inner surface 204 of the spherical housing 202, wherein wheels 218 and 220 included as components of the drive system 201 make contact with the inner surface 204 to cause the self-propelled device 200 to move. Additionally, the self-propelled device 200 can include several mechanical and electronic components enclosed within the spherical housing 202.

The spherical housing 202 can be at least partially composed of one or more materials that allow for the transmission of signals used for wireless communication, and yet can be impervious to moisture and dirt. The spherical housing 202 material can be durable, washable, and/or shatter resistant. The spherical housing 202 can also be structured to enable transmission of light and can be textured to diffuse the light.

In variations, the spherical housing 202 can be made of a sealed polycarbonate plastic. In similar variations, at least one of the spherical housing 202, or the inner surface 204, can be textured to diffuse light. As an addition or an alternative, the spherical housing 202 can comprise two hemispherical shells with an associated attachment mechanism, such that the spherical housing 202 can be opened to allow access to the internal electronic and mechanical components. In similar variations, the spherical housing 202 can include automatic opening means configured to open the housing upon a command prompt by a user using the controller device. As an addition or alternative, the spherical housing 202 can be opened to deposit a payload placed in a payload space 228, and then subsequently closed such that the user can continue maneuvering the self-propelled device 200. The spherical housing 202 can further include a treaded outer surface, or an outer surface that includes knobs and/or nodules for traction.

Several electronic and mechanical components can be positioned inside the spherical housing 202 for enabling processing, wireless communication, propulsion, and other functions. Among the components, a drive system 201 can be included to enable the device to propel itself. The drive system 201 can be coupled to processing resources and other control mechanisms as described above with reference to FIG. 1. Referring still to FIG. 2A, a carrier 214 can be included to serve as an attachment point and support for electronic components of the self-propelled device 200. The drive system 201, energy storage unit 216, carrier 214, biasing mechanism 215, other components such as described above with reference to FIG. 1, and any payload items that can ultimately occupy a payload space 228, cannot be rigidly mounted to the spherical housing 202. Instead, wheels 218, 220 included in the drive system 201 can be in frictional contact with the inner surface 204 of the spherical housing 202, and can function to drive the spherical housing 202 by the action of the actuators.

The carrier 214 can be in mechanical and electrical contact with the energy storage unit 216. The energy storage unit 216 can provide a reservoir of energy to power the device and electronics and can be replenished via the inductive charge port 226. For example, the energy storage unit 216 can a rechargeable battery and can be composed of lithium-polymer cells.

The carrier 214 can provide a mounting location for most of the internal components, including printed circuit boards for electronic assemblies, the sensor array, one or more antenna, and one or more connectors, as well as providing a mechanical attachment point for internal components. Further, the carrier 214 can provide a base for payloads being placed within the self-propelled device 200. In this manner, the top surface of the carrier 214 can also be the floor of the payload space 228. However, other configurations of the payload space 228 are contemplated, such as for example, a payload space 228 specially formed for a camera, or one that includes compartments for carrying multiple items.

The drive system 201 includes motors 222, 224 and the wheels 218, 220. The motors 222, 224 connect to the wheels 218, 220 independently through an associated shaft, axle, and gear drive (not shown). The wheels 218, 220 can be in physical contact with inner surface 204. The points where wheels 218, 220 contact the inner surface 204 are an essential part of the drive mechanism of the self-propelled device 200, and so are preferably coated with a material to increase friction and reduce slippage. For example, the circumference of the wheels 218, 220 can be coated with silicone rubber tires.

The biasing mechanism 215 can be included to actively force the wheels 218, 220 against the inner surface 204. As an example, a spring 212 and spring end 210 can comprise the biasing mechanism 215. More specifically, the spring 212 and the spring end 210 can be positioned to contact the inner surface 204 at a point diametrically opposed to the wheels 218, 220. The spring 212 and the spring end 210 can provide contact force to reduce or substantially eliminate slippage of the wheels 218, 220. The spring 212 is selected to provide a small force pushing wheels 218, 220, and the spring end 210 evenly against inner surface 204.

The spring end 210 provides near-frictionless contact with the inner surface 204. As such, the spring end 210 comprises a rounded or quasi-rounded surface configured to slide along the inner surface 204 as the self-propelled device 200 is driven by the drive system 201. Additional means of providing near-frictionless contact can be included. In some implementations, the spring end 210 can include one or more bearings to further reduce friction at the contact point where the spring end 210 moves along the inner surface 204. Furthermore, the spring 212 and the spring end 210 can be composed of a non-magnetic material to avoid interference with sensitive magnetic sensors.

The payload space 228 can be incorporated to carry a single payload or multiple payloads for civilian and/or military activities. The payload space 228 can be arranged to carry any number of payloads, including, for example, one or more of: a camera for surveillance or remote video stream, an infrared sensor, a chemical or biological sensor to detect harmful agents, an explosive or flash bang that can be maneuvered into place and detonated, and/or a listening device.

Figure 2B:
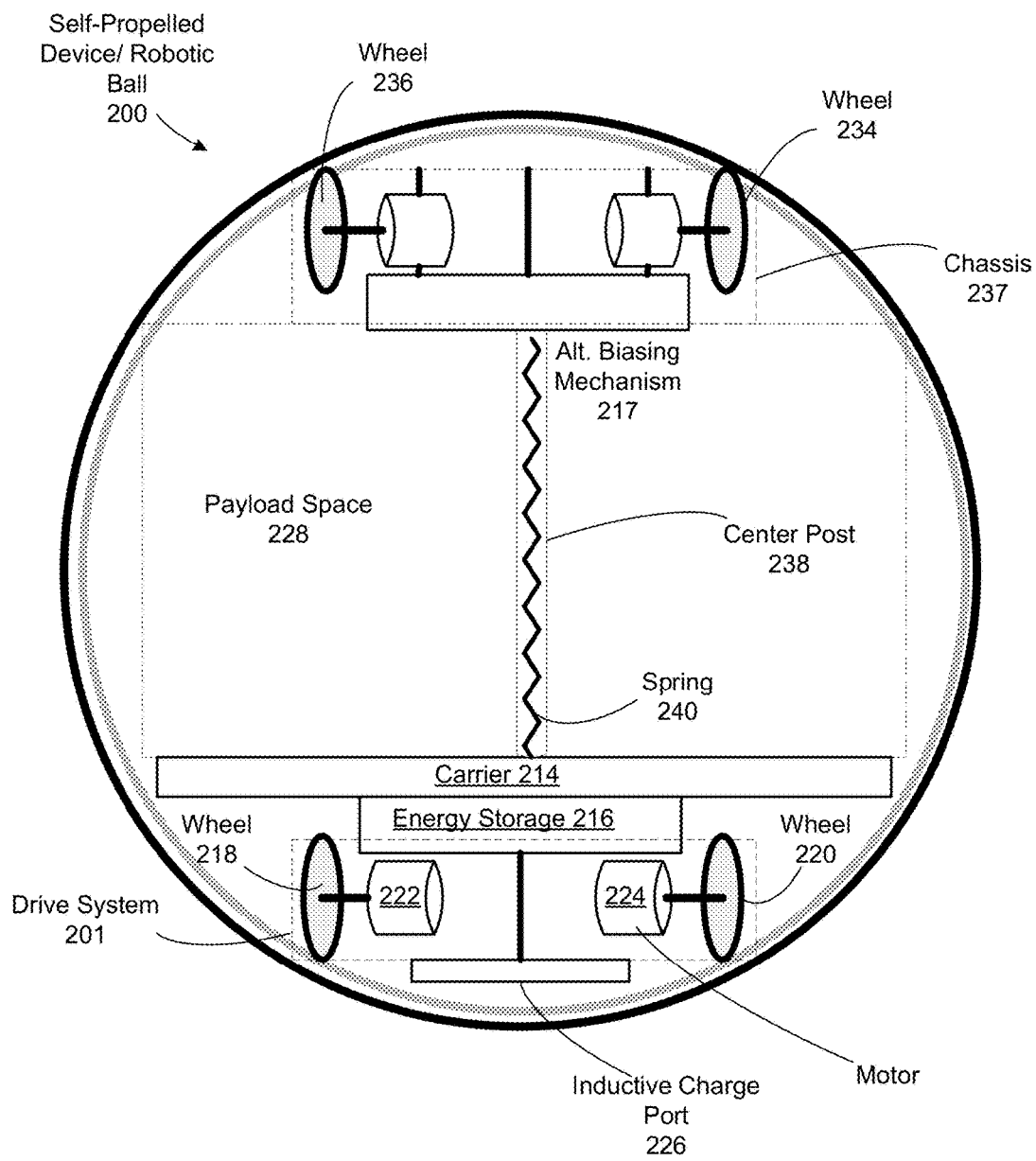
FIG. 2B is an example block diagram illustrating a self-propelled device with an alternative biasing mechanism.

FIG. 2B is an example block diagram illustrating a self-propelled device with an alternative biasing mechanism 217. Referring to FIG. 2B, the biasing mechanism 217 can incorporate a chassis 237 which can include one or more additional wheels 234, 236 to increase or reconfigure the payload space 228. The biasing mechanism 217 can include a center post 238 configured to exert a force against the chassis 237 which can, in turn, press the additional wheels 234, 236 against inner surface 204 of the spherical housing 202. The center post 238 may or may not include a spring 240 to aid in the biasing. Alternatively, the chassis 237 may be placed proximate to the drive system 201 such that the wheels 218, 220, 234, and 236 contact the inner surface 204 in the same hemisphere, as opposed to being diametrically opposite. As an addition or alternative, the chassis 237 may be positioned such that the center post 238 forms an angle, wherein the additional wheels 234, 236 contact the inner surface 204 slightly above the equator (in a reference frame where the drive system 201 is positioned at the very bottom of the self-propelled device 200). These arrangements, and similar arrangements, may be included to, for example, maximize or optimize the payload space 228.

Figure 2C:
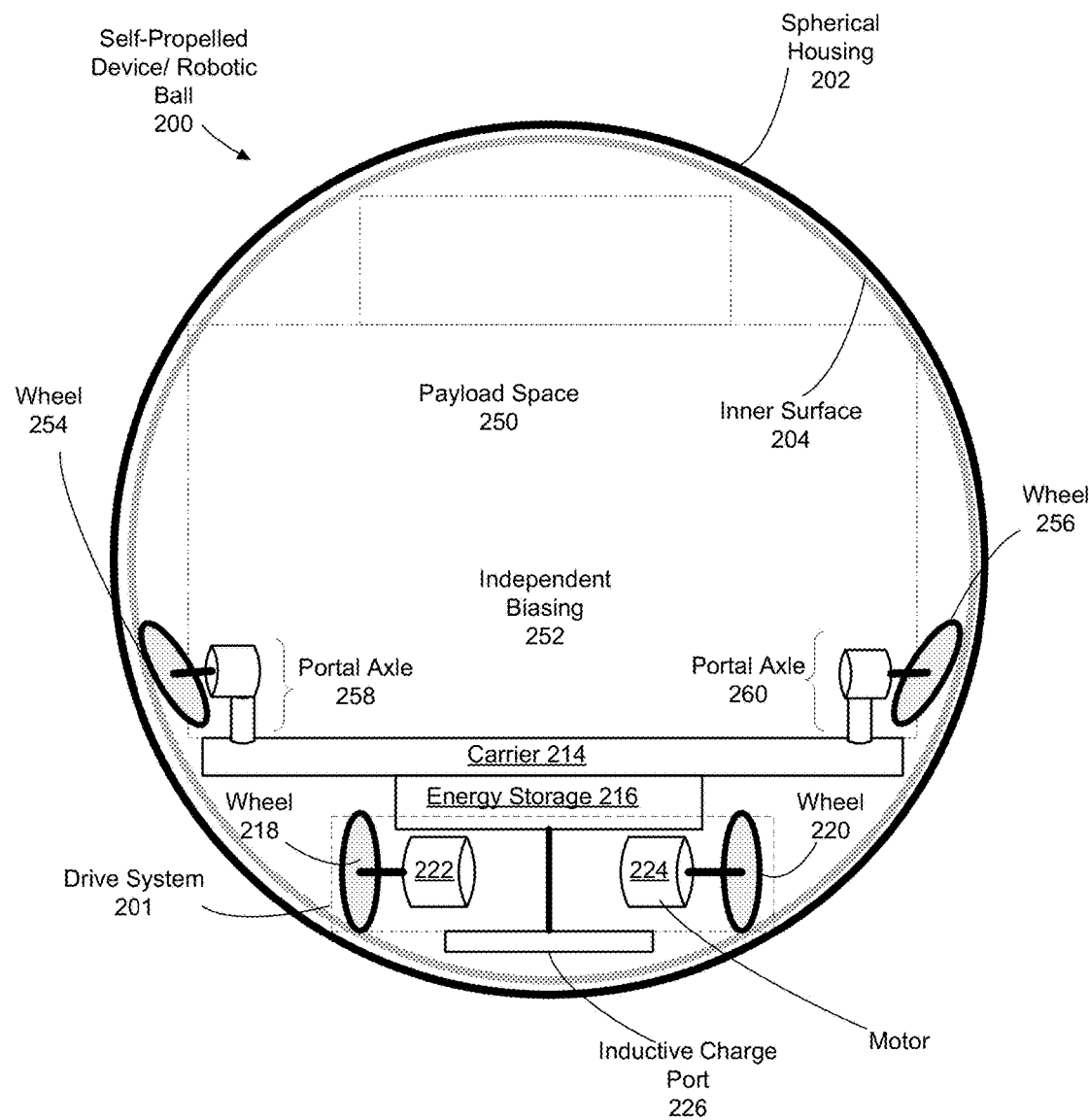
FIG. 2C is an example block diagram illustrating a self-propelled device with another alternative biasing mechanism to improve payload space.

FIG. 2C is an example block diagram illustrating a self-propelled device with another alternative biasing mechanism to improve payload space 250. For example, an independent biasing mechanism 252 can be included configured to actively force the drive system wheels 218, 220 against the inner surface 204, similar to the biasing mechanisms discussed above with respect to FIGS. 2A and 2B. The independent biasing mechanism 252 is comprised of two or more separate portal axles 258, 260. The portal axles 258, 260 may include springs to press respective wheels 254, 256 against the inner surface 204 with a force vector having a vertical value. The vertical force from the wheels 254, 256 pressing against the inner surface 204 in turn, actively forces the drive system 201 and its respective wheels 254, 256 against the inner surface 204 as well, thereby providing sufficient force for the drive system 201 to cause the self-propelled device 200 to move.

As shown, the independent biasing mechanism 252 with its two or more portal axles 258, 260 allows for significantly increased payload space 250, whereby any number of different types or sizes of payload (e.g. a camera, infrared sensor, chemical or biological sensor, one or more explosives, a listening device, etc.) can be positioned within the space 250. By removing the biasing mechanism configurations as shown by examples of FIGS. 2A and 2B, and replacing them with an independent biasing mechanism 252 with independent portal axles 258, 260, the interior of the self-propelled device 200 can be cleared to provide a spacious interior. The portal axles 258, 260 comprising the independent biasing mechanism 252 can be mounted directly onto the carrier 214. The springs corresponding to the portal axles 258, 260 may be in the form of torsion springs which force the wheels 254, 256 against the inner surface 204. As an addition or alternative, the springs may be comprised of one or more of a compression spring, clock spring, or tension spring. Alternatively, the portal axles 258, 260 can be mounted in such a manner in which no springs are included to maintain a force pressing the drive system 201 and wheels 218, 220 against the inner surface 204, allowing sufficient traction to cause the self-propelled device 200 to move.

Figure 3:
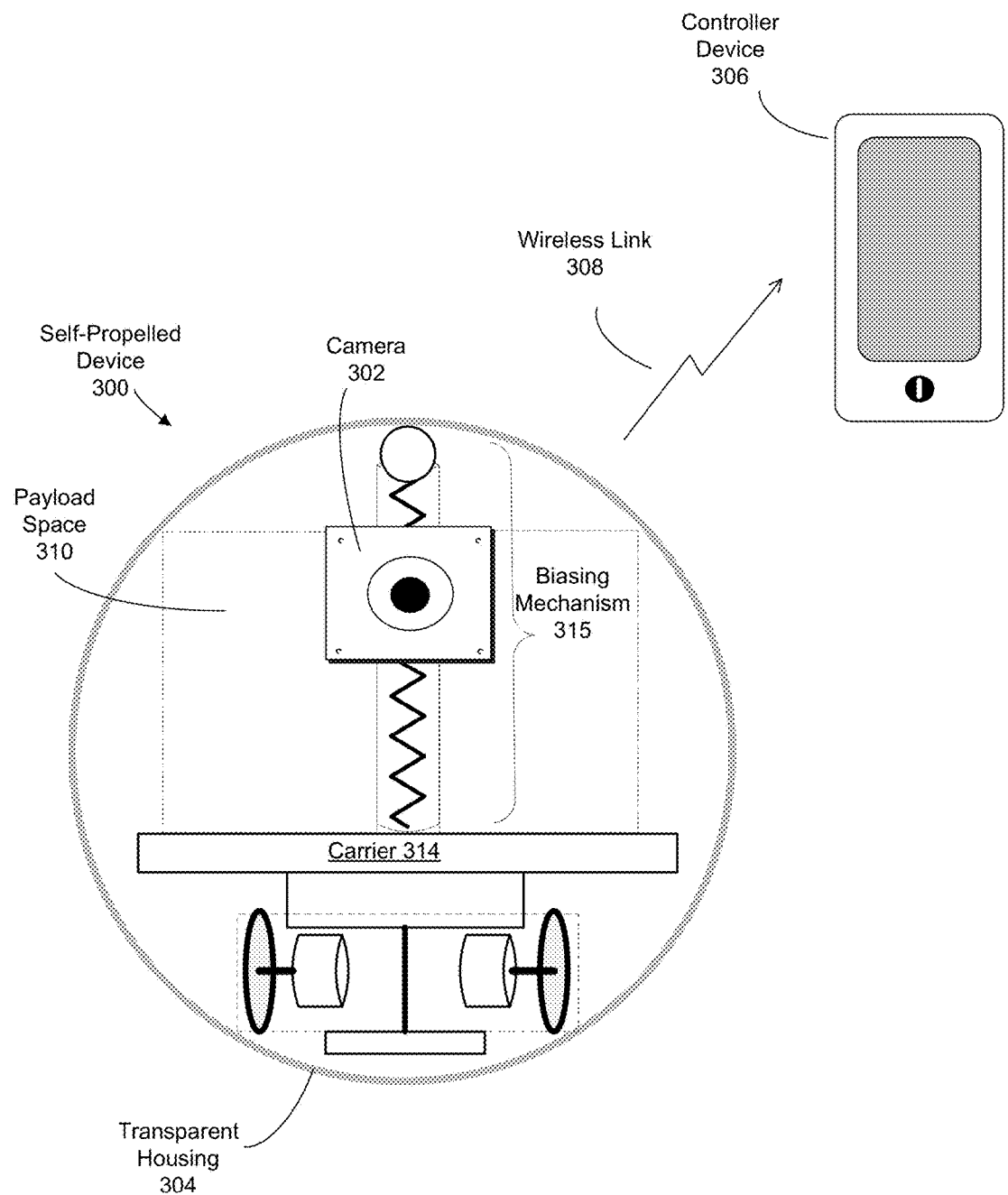
FIG. 3 is an example block diagram illustrating a self-propelled device including an attached camera therein.

FIG. 3 is an example block diagram illustrating a self-propelled device including a camera. The multi-purpose self-propelled device 300 can include a camera 302 mounted within the payload space 310. For example, the spherical housing 304 is transparent to allow the camera 302 to view outside the self-propelled device 300. The camera 302 can be mounted on the biasing mechanism, or otherwise mounted within the self-propelled device 300 in order to maintain a substantially level orientation. For example, the camera 302 can be mounted to the carrier 314 to achieve the same.

The camera 302 can be mounted on a gyroscope or other stabilizing means so that the camera's orientation can be more substantially level with an outside reference frame. For example, the stabilizing means (not shown) can be mounted on the biasing mechanism 315 and/or the carrier 314 in order to achieve further stability and to further maintain orientation. For self-propelled devices 300 having an independent biasing mechanism using portal axles as discussed with respect to FIG. 2C, the camera 302 can be mounted to the carrier 314.

As an addition or alternative, the camera 302 can further be coupled to the wireless communication module. The camera 302 can provide photographs and/or a video stream to the controller device 306 by way of a wireless link 308. In similar arrangements, the self-propelled device can be remotely controlled by a user using the controller device 306 via the wireless link 308. As implemented, the self-propelled device 300 can be controlled utilizing the video stream, and therefore, the user need not be in visual sight of the self-propelled device 300 in order to maintain effective operation.

The camera 302 can be any photo or video recording device. The camera 302 can itself contain wireless communication means, such that it may directly link with the controller device 306. Alternatively, the camera 302 can be coupled to the processor and the video stream may be fed to the controller device 306 via the wireless module included in the system as described above with respect to FIG. 1.

The controller device 306 can be a remote control, smartphone, tablet, or a customized device capable of storing and executing applications or instructions to operate the self-propelled device 300. For example, the controller device 306 can be in the form of a smartphone or tablet, and operation of the self-propelled device can be executed by way of an application stored in the smartphone or tablet. Alternatively, the controller device 306 and self-propelled device 300 can be manufactured as a combined system specially manufactured for one or more purposes. For example, the combined system of the self-propelled device 300 and the controller device 306 can be used specifically for surveillance. Further, an application of the controller device 306 can include a "touch and drive" feature, wherein the user can touch the display of the controller device 306 corresponding to a selected location, and caused the self-propelled device 300 to maneuver to that location. The "touch and drive" feature can further allow the user to select a location on the display of the controller device 306, where the selected location corresponds to the same location on the video stream. In other words, the user can "touch" a location on the video stream from the self-propelled device 300, and the self-propelled device 300 will automatically maneuver itself to that location.

Figure 4:
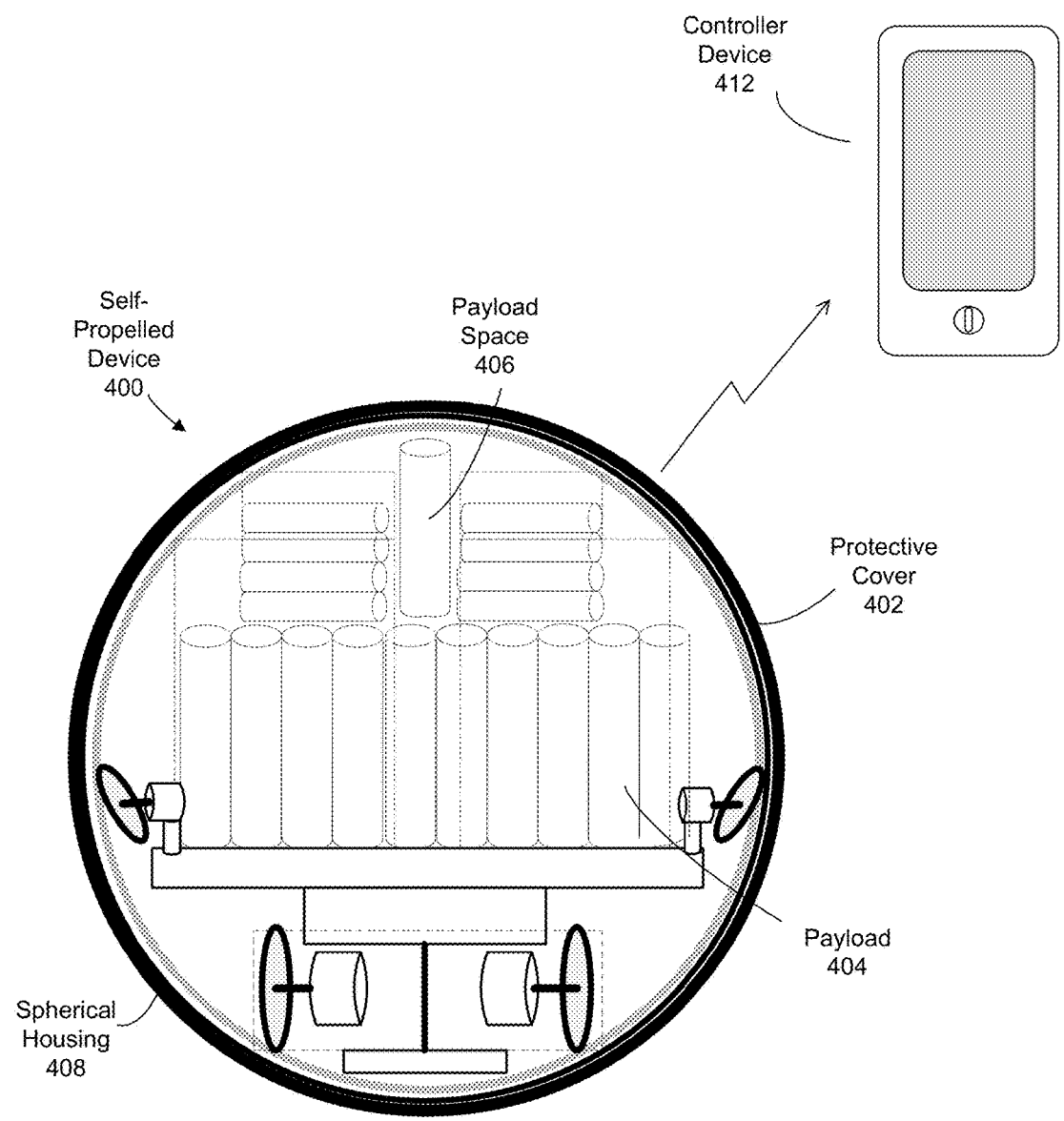
FIG. 4 is an example block diagram illustrating a self-propelled device including a payload.

FIG. 4 is an example block diagram illustrating a self-propelled device including a payload. Referring to FIG. 4, the self-propelled device includes a payload space 406 to carry and transport specific items or payload 404 for various activities. Such items can include one or more of: an infrared sensor, a chemical or biological sensor, an explosive or flash bang, a listening device, other mechanical devices, and the like. Any one or more of these items can further be included in variations including a camera as described above with reference to FIG. 3.

As shown in an example of FIG. 4, the self-propelled device 400 includes a payload space 406 for carrying a payload 404. The self-propelled device 400 can be constructed in manner in which it can be thrown by a user, and then controlled via the controller device 412. A protective cover 402 can be included to dampen shock when, for example, the self-propelled device 400 is thrown by a user. The protective cover 402 can be removable and/or can be configured to break away from the self-propelled device 400 during periods of extreme shock. In such examples, the self-propelled device 400 can break free of the protective cover 402 and proceed with its intended purpose.

The protective cover 402 can be included to seal or waterproof the self-propelled device 400. For example, the self-propelled device 400 can be further configured to float or sink depending on its intended application. Furthermore, the self-propelled device 400 can float when deposited into water in order to be easily retrievable.

Examples as shown in FIG. 4 can be manufactured for a singular purpose, or can be configured to be loaded and unloaded multiple times. The latter can include a spherical housing 408 and/or a protective cover 402 that can be readily opened or closed by a user. Single purpose examples can be manufactured to be permanently sealed, and the payload 404 of such arrangements can be selected for the singular purpose. For example, the payload 404 can be an explosive, where the self-propelled device 400 is utilized for a single use. As implemented, the self-propelled device 400 can be maneuvered to a selected location and then detonated, effectively destroying the self-propelled device 400.

Alternatively, the self-propelled device 400 can be configured to open upon a command prompt by a user and deposit its payload 404 at a selected location. The user can then cause the spherical housing 408 to close using the controller device 412 and proceed to continue maneuvering the self-propelled device 400. Furthermore, the self-propelled device 400 and controller device 412 can include the "touch and drive" feature as described above with respect to FIG. 4.

Figure 5:
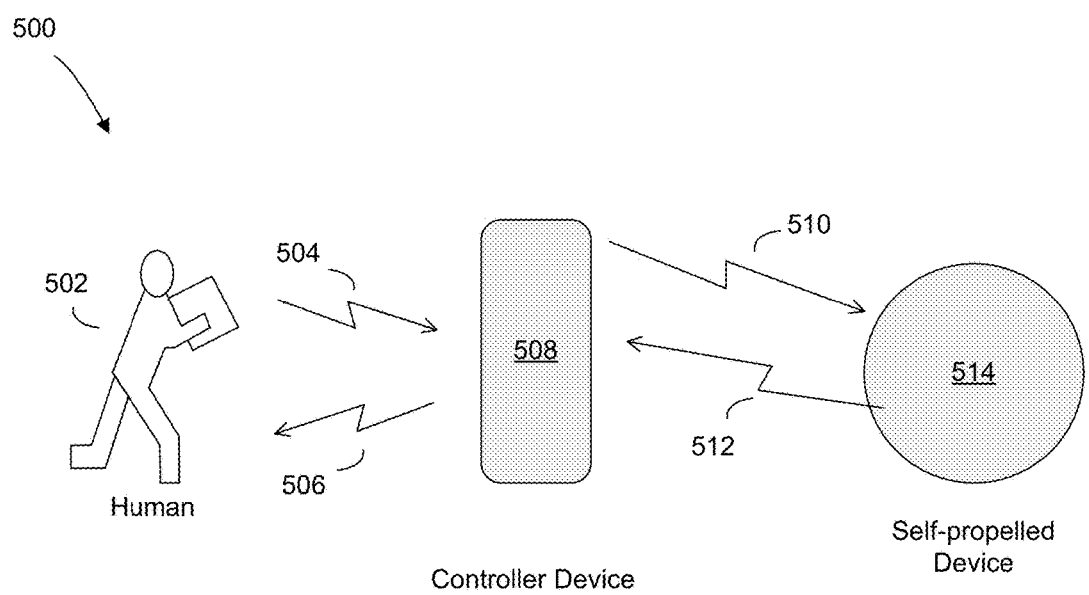
FIG. 5 is an example schematic depiction of a self-propelled device and a controller device.

FIG. 5 is an example schematic depiction of a self-propelled device 514 and a controller device 508. More specifically, the self-propelled device 514 can be controlled in its movement by programming logic and/or controls that can originate from the controller device 508. The self-propelled device 514 is capable of movement under control of the controller device 508, which can be operated by a user 502. The controller device 508 can wirelessly communicate control data to the self-propelled device 514 using a standard or proprietary wireless communication protocol. In variations, the self-propelled device 514 can be at least partially self-controlled, utilizing sensors and internal programming logic to control the parameters of its movement (e.g., velocity, direction, etc.). Still further, the self-propelled device 514 can communicate data relating to the device's position and/or movement parameters for the purpose of generating or alternating content on the controller device 508. In additional variations, self-propelled device 514 can control aspects of the controller device 508 by way of its movements and/or internal programming logic.

As described herein, the self-propelled device 514 can have multiple modes of operation, including those of operation in which the device is controlled by the controller device 508, is a controller for another device (e.g., another self-propelled device or the controller device 508), and/or is partially or wholly self-autonomous.

Additionally, the self-propelled device 514 and the controller device 508 can share a computing platform on which programming logic is shared, in order to enable, among other features, functionality that includes: (i) enabling the user 502 to operate the controller device 508 to generate multiple inputs, including simple directional input, command input, gesture input, motion or other sensory input, voice input or combinations thereof; (ii) enabling the self-propelled device 514 to interpret inputs received from the controller device 508 as a command or set of commands; and/or (iii) enabling the self-propelled device 514 to communicate data regarding that device's position, movement and/or state in order to effect a state on the controller device 508 (e.g., display state, such as content corresponding to a controller-user interface). Furthermore, the self-propelled device 514 can include a programmatic interface that facilitates additional programming logic and/or instructions to use the device. The controller device 508 can execute programming that is communicative with the programming logic on the self-propelled device 514.

Accordingly, the self-propelled device 514 can include an actuator or drive mechanism causing motion or directional movement. The self-propelled device 514 can be referred to by a number of related terms and phrases, including controlled device, robot, robotic device, remote device, autonomous device, and remote-controlled device. In variations, the self-propelled device 514 can be structured to move and be controlled in various media. For example, the self-propelled device 514 can be configured for movement in media such as on flat surfaces, sandy surfaces, or rocky surfaces.

The self-propelled device 514 can be implemented in various forms. For example, the self-propelled device 514 can correspond to a spherical object that can roll and/or perform other movements such as spinning. In variations, the self-propelled device 514 can correspond to a radio-controlled aircraft, such as an airplane, helicopter, hovercraft or balloon. In other variations, the self-propelled device 514 can correspond to a radio controlled watercraft, such as a boat or submarine. Numerous other variations can also be implemented, such as those in which the self-propelled device 514 is a robot.

Furthermore, the self-propelled device 514 can include a sealed hollow housing, roughly spherical in shape, capable of directional movement by action of actuators inside the enclosing envelope.

Referring still to FIG. 5, the self-propelled device 514 can be configured to communicate with the controller device 508 using network communication links 510 and 512. Link 510 can transfer data from the controller device 508 to the self-propelled device 514. Link 512 can transfer data from the self-propelled device 514 to the controller device 508. Links 510 and 512 are shown as separate unidirectional links for illustration. As an example, a single bi-directional communication link performs communication in both directions. Link 510 and link 512 are not necessarily identical in type, bandwidth or capability. For example, communication link 510 from controller device 508 to self-propelled device 514 is often capable of a higher communication rate and bandwidth compared to link 512. In some situations, only one link 510 or 512 is established. In such examples, communication is unidirectional.

The controller device 508 can correspond to any device comprising at least a processor and communication capability suitable for establishing at least unidirectional communications with the self-propelled device 514. Examples of such devices include, without limitation: mobile computing devices (e.g., multifunctional messaging/voice communication devices such as smart phones), tablet computers, portable communication devices and personal computers. For example, the controller device 508 is an IPHONE available from APPLE COMPUTER, INC. of Cupertino, Calif. In another example, the controller device 508 is an IPAD tablet computer, also from APPLE COMPUTER. In still other examples, the controller device 508 is any of the handheld computing and communication appliances executing the ANDROID operating system from GOOGLE, INC.

Elsewise, the controller device 508 can be a personal computer, in either a laptop or desktop configuration. For example, the controller device 508 can be a multi-purpose computing platform running the MICROSOFT WINDOWS operating system, or the LINUX operating system, or the APPLE OS/X operating system, configured with an appropriate application program to communicate with the self-propelled device 514.

In variations, the controller device 508 can be a specialized device dedicated for enabling the user 502 to control and interact with the self-propelled device 514.

Furthermore, multiple types of controller devices 508 can be used interchangeably to communicate with the self-propelled device 514. Additionally or as an alternative, the self-propelled device 514 can be capable of communicating and/or being controlled by multiple devices (e.g., concurrently or one at a time). For example, the self-propelled device 514 can be capable of being linked with an IPHONE in one session and with an ANDROID device in a later session, without modification of the device 514.

Accordingly, the user 502 can interact with the self-propelled device 514 via the controller device 508, in order to control the self-propelled device 514 and/or to receive feedback or interaction on the controller device 508 from the self-propelled device 514. Furthermore, the user 502 can specify a user input 504 through various mechanisms that are provided with the controller device 508. Examples of such inputs include text entry, voice command, touching a sensing surface or screen, physical manipulations, gestures, taps, shaking and combinations of the above.

The user 502 can interact with the controller device 508 in order to receive feedback 506. The feedback 506 can be generated on the controller device 508 in response to user input. As an alternative or addition, the feedback 506 can also be based on data communicated from the self-propelled device 514 to the controller device 508, regarding, for example, the self-propelled device's 514 position or state. Without limitation, examples of feedback 506 include text display, graphical display, sound, music, tonal patterns, modulation of color or intensity of light, haptic, vibrational or tactile stimulation. The feedback 506 can be combined with input that is generated on the controller device 508. For example, the controller device 508 can output content that can be modified to reflect position or state information communicated from the self-propelled device 514.

As an example, the controller device 508 and/or the self-propelled device 514 can be configured such that user input 504 and feedback 506 maximize usability and accessibility for the user 502, who has limited sensing, thinking, perception, motor or other abilities. This allows users with handicaps or special needs to operate the system 500 as described.

A configuration as illustrated in FIG. 5, can be only one of an almost unlimited number of possible configurations of networks including a self-propelled device 514 with communication connections. Furthermore, while numerous variations described herein provide for a user to operate or otherwise directly interface with the controller device 508 in order to control and/or interact with a self-propelled device, variations described encompass enabling the user to directly control or interact with the self-propelled device 514 without use of an intermediary device such as the controller device 508.

Figure 6:
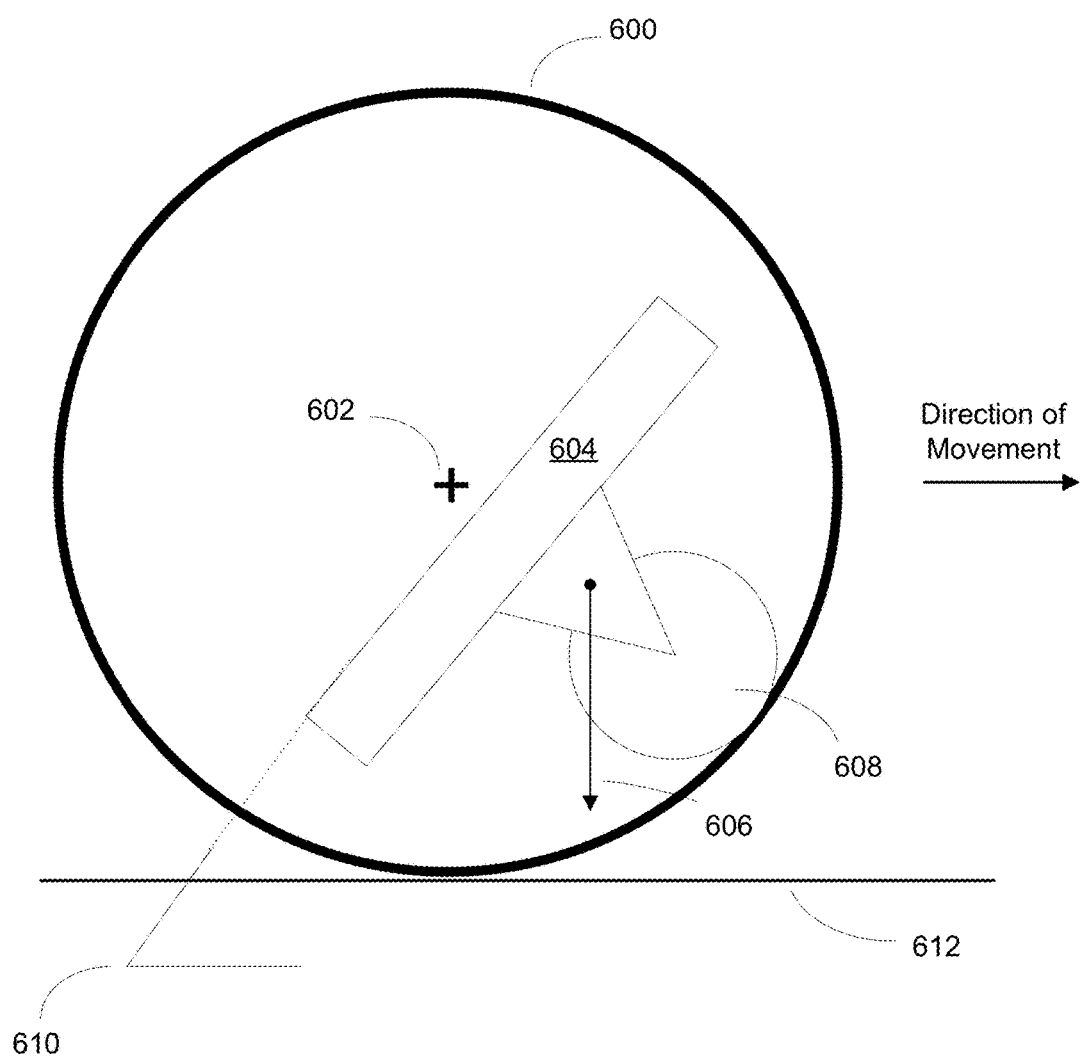
FIG. 6 illustrates an example technique for causing motion of a self-propelled spherical device.

FIG. 6 illustrates an example technique for causing motion of a self-propelled spherical device 600. As shown by an example of FIG. 6, the device 600 has a center of rotation 602 and a center of mass 606, the device 600 being contact with planar surface 612. The drive mechanism for the robotic device 600 comprises two independently-controlled wheeled actuators 608 in contact with the inner surface of the enclosing spherical envelope of device 600. Also shown is sensor platform 604. Several components of device 600 are not shown in FIG. 6 for simplicity of illustration.

To achieve continuous motion at a constant velocity, the displacement of center of mass 606 relative to center of rotation 602 can be maintained by action of wheeled actuators 608. The displacement of the center of mass 606 relative to the center of rotation 602 is difficult to measure, thus it is difficult to obtain feedback for a closed-loop controller to maintain constant velocity. However, the displacement is proportional to the angle 610 between sensor platform 604 and surface 612. The angle 610 can be sensed or estimated from a variety of sensor inputs, as described herein. Therefore, the speed controller for robotic device 600 can be implemented to use angle 610 to regulate speed for wheeled actuators 608 causing the device 600 to move at a constant speed across the surface 612. The speed controller can determine the desired angle 610 to produce the desired speed, and the desired angle set point can be provided as an input to a closed loop controller regulating the drive mechanism.

FIG. 6 illustrates use of angle measurement for speed control. However, the technique can further be extended to provide control of turns and rotations, with feedback of appropriate sensed angles and angular rates.

It can be seen from the foregoing discussion that knowledge of the orientation angles is useful, in variations, for control of the self-propelled device 600. Measuring the orientation of the device can also be useful for navigation and alignment with other devices.

Figure 7:
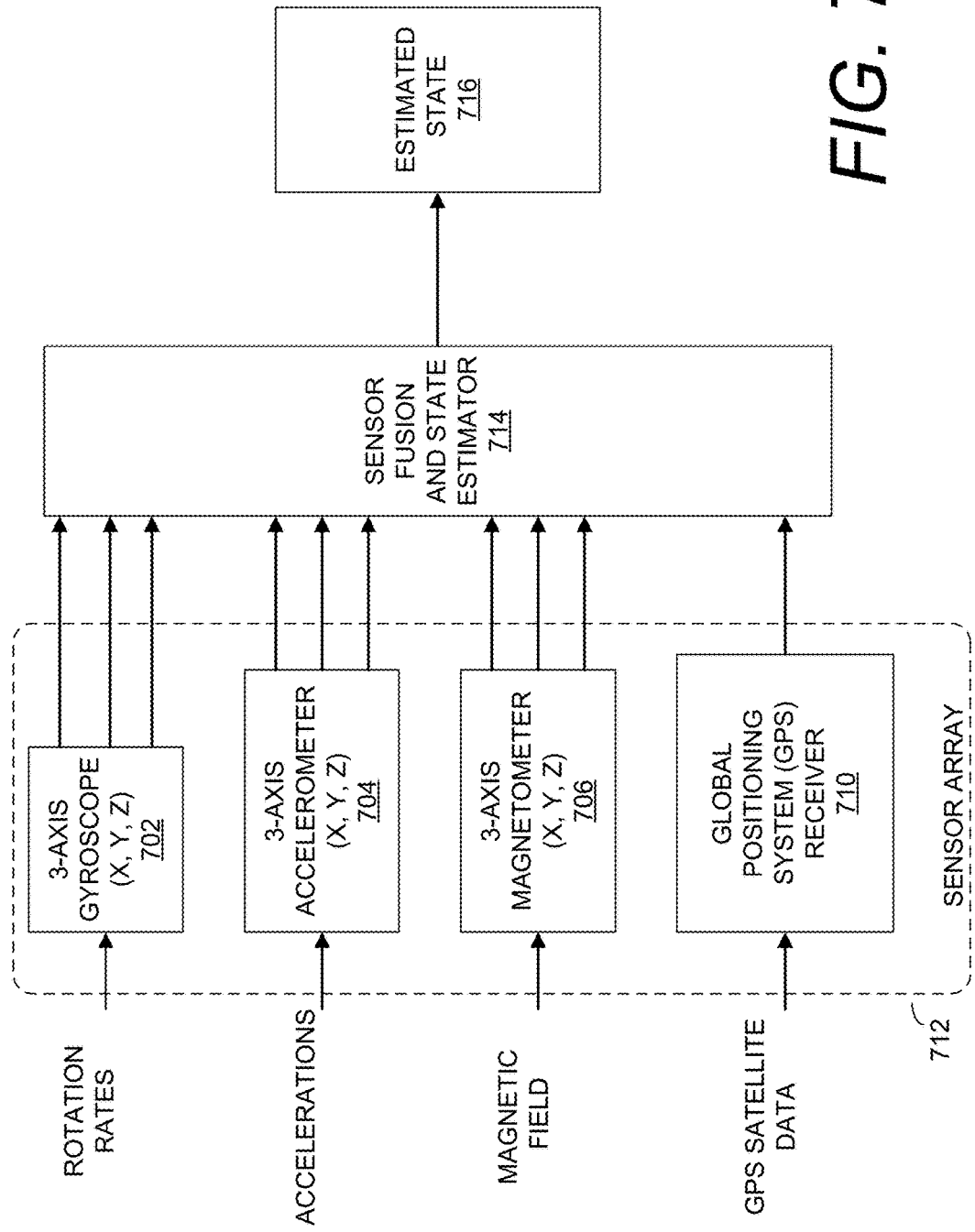
FIG. 7 is an example block diagram depicting a sensor array and data flow.

FIG. 7 is an example block diagram depicting a sensor array and data flow. Referring to FIG. 7, the sensor array 712 can include a set of sensors for providing information to the self-propelled device, including for example, its position, orientation, rates of translation, rotation, and acceleration. Many other sensors can be included to meet requirements in various examples.

In variations, the sensor array 712 can include a three-axis gyroscopic sensor 702, a three-axis accelerometer sensor 704, and a three-axis magnetometer sensor 706. In certain variations, a receiver for a Global Positioning System (GPS) is included 710. However, GPS signals are typically unavailable indoors, so the GPS receiver can be omitted.

Due to limitations in size and cost, the sensors in sensor array 712 can be miniaturized devices employing micro-electro-mechanical (MEMS) technology. The data from these sensors can require filtering and processing to produce accurate state estimates 716. Various algorithms can be employed in sensor fusion and state estimator 714. These algorithms can be executed by the processor on the self-propelled device.

Those familiar with the art will understand that the signals from sensor in sensor array 712 can be imperfect and distorted by noise, interference, and the limited capability of inexpensive sensors. However, the sensors can also provide redundant information, so that application of a suitable sensor fusion and state estimator process 714 can provide an adequate state estimation 716 of the true state of the self-propelled device.

For example, in many situations, magnetometer data is distorted by stray magnetic fields and ferrous metals in the vicinity. Sensor fusion and state estimator 714 can be configured to reject bad or suspect magnetometer data and rely on the remaining sensors in estimating the state 716 of the self-propelled device. In some examples, particular movements of the self-propelled device can be used to improve sensor data for desired purposes. For example, it can be useful to rotate self-propelled device through an entire 360 degree heading sweep while monitoring magnetometer data, to map local magnetic fields. Since the fields are usually relatively invariant over a short period of time, the local field measurement is repeatable and therefore useful, even if distorted.

Architecture

Figure 8:
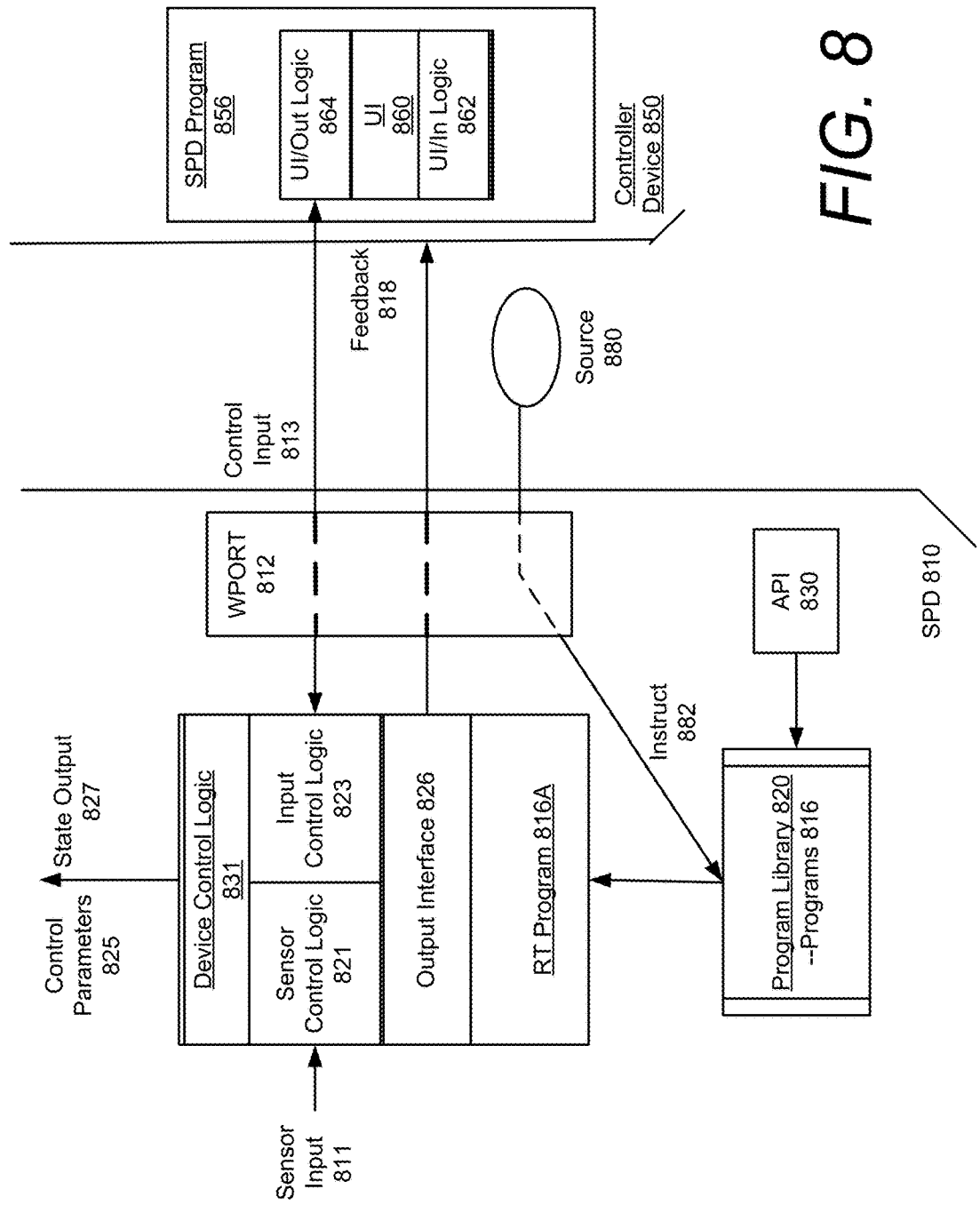
FIG. 8 illustrates an example system including a self-propelled device and a controller device to control and interact with the self-propelled device.

FIG. 8 illustrates an example system including a self-propelled device 810 and a controller device 850 that controls and interacts with the self-propelled device 810. The self-propelled device 810 can be constructed using hardware resources such as described by examples of FIG. 1. Accordingly, the self-propelled device 810 can be a spherical object such as described by examples with respect to FIGS. 2-4. The controller device 850 can be a multifunctional device, such as a mobile computing device (e.g., smart phone), tablet, or personal computer. Alternatively, the controller device 850 can correspond to a specialized device that is dedicated to controlling and communicating with the self-propelled device 810.

The self-propelled device 810 can execute one or more programs 816 stored in a program library 820. Each program 816 in the program library 820 can include instructions or rules for operating the device, including instructions for how the device is to respond to specific conditions, how the device is to respond to a control input 813 (e.g., user input entered on the controller device 850), and/or the mode of operation that the device is to implement (e.g., controlled mode, versus autonomous, etc.).

The program library 820 can also maintain an instruction set that can be shared by multiple programs, including instructions that enable some user inputs to be interpreted in a common manner. An application program interface (API) 830 can be implemented on the device 810 to enable programs to access a library of functions and resources of the device. For example, the API 830 can include functions that can be used with programs to implement motor control (e.g., speed or direction), state transition, sensor device interpretation, and/or wireless communications.

In certain implementations, the device 810 can receive programs and programming instructions wirelessly through the use of a wireless communication port 812. In variations, the device 810 can receive programs and programming instructions 882 from external sources 880 via other ports, such as an expansion port 120 (see FIG. 1). The programming resources can originate from, for example, a media provided to the user of the device (e.g., SD card), a network resource or website where programs can be downloaded, and/or programs and/or instruction sets communicated via the wireless communication port 812 from the controller device 850. In several implementations, the controller device 850 can be programmatically configured to interact and/or control the self-propelled device 810 with software. Once configured, the controller device 850 can communicate instructions coinciding with its programmatic configuration to the self-propelled device 810. For example, the controller device 850 can download an application for controlling or interacting with the self-propelled device 810. The application can be downloaded from, for example, a network (e.g., from an App Store), or from a website, using wireless communication capabilities inherent in the controller device 850 (e.g., cellular capabilities, Wi-Fi capabilities, etc.). The application that is downloaded by the controller device 850 can include an instruction set that can be communicated to the self-propelled device 810.

The controller device 850 can execute a program 856 that is specialized or otherwise specific to communicating or interacting with, and/or controlling the self-propelled device 810. In variations, the program 856 that executes on the controller device 850 can include a counterpart program 816A that can execute on the self-propelled device 810. The programs 856, 816A can execute as a shared platform or system. For example, as described below, the program 856 operating on the controller device 850 can cooperate with the counterpart runtime program 816A to generate input for the self-propelled device 810, and to generate output on the controller device 850 based on a data signal from the self-propelled device 810. For example, the program 856 can generate a user interface 860 that (i) prompts or provides guidance for the user to provide input that is interpretable on the self-propelled device 810 as a result of the counterpart runtime program 816A, resulting in some expected outcome from the self-propelled device 810; and (ii) receives feedback 818 from the self-propelled device 810 in a manner that affects the content that is output by the program 856 operating on the controller device 850. In the latter case, for example, computer-generated content can be altered based on positioning or movement of the self-propelled device 810.

More specifically, on the controller device 850, the program 856 can provide a user interface 860, including logic 862 for prompting and/or interpreting user input on the controller device. Various forms of input can be entered on the controller device 850, including, for example, user interaction with mechanical switches or buttons, touchscreen input, audio input, gesture input, or movements of the device in a particular manner.

Accordingly, the program 856 can be configured to utilize an inherent application program interface on the controller device 850, to utilize the various resources of the device to receive and process input. Many existing multifunctional or general purpose computing devices (e.g., smart phones or tablets) can be configured to detect various kinds of input, including touchscreen input (e.g., multi-touch input or gesture input), optical input (e.g., camera image sensing input), audio input and device movement input (e.g., shaking or moving the entire device). The user interface 860 can include logic 862 to prompt the user for specific kinds of input (e.g., include visual markers where a user should place fingers, instruct the user or provide the user with the visual and/or audio prompt to move the device, etc.), and to interpret the input into control information that is signaled to the self-propelled device 810.

In some implementations, the input generated on the controller device 850 can be interpreted as a command and then signaled to the self-propelled device 810. In other implementations, the input entered on the controller device 850 can be interpreted as a command by programmatic resources on the self-propelled device 810. By interpreting user input in the form of commands, the self-propelled device 810 can respond to user input in a manner that is intelligent and configurable. For example, the self-propelled device 810 can interpret user input that is otherwise directional in nature in a manner that is not directional. For example, a user can enter gesture input corresponding to a direction, in order to have the self-propelled device 810 move in a manner that is different than the inherent direction in the user input. For example, a user can enter a leftward gesture, which the device can interpret (based on the runtime program 816A) as a command to stop, spin, return home, or alter illumination output, etc.

The user interface 860 can also include output logic 864 for interpreting data received from the self-propelled device 810. As such, the self-propelled device 810 can communicate information, such as state information and/or position information (e.g., such as after when the device moves) to the controller device 850. In one implementation, the communication from the self-propelled device 810 to the controller device 850 can be in response to a command interpreted from user input on the controller device 850. In another implementation, the communication from the self-propelled device 810 can be in the form of continuous feedback generated as result of the device's continuous movement over a duration of time. In variations, the output onto device 850 can correspond to a controller device having one of various possible form factors. The program 856 can configure the interface to graphically provide gaming context and/or different user-interface paradigms for controlling the self-propelled device 810. The program 856 can operate to directly affect the content generated in these implementations based on movement, position, or state of the self-propelled device 810.

In operation, the self-propelled device 810 can implement the programmatic runtime 816A using one or more sets of program instructions stored in its program library 820. The program runtime 816A can correspond to, for example, a program selected by the user, or one that is run by default or in response to some other condition or trigger. Among other functionality, the program runtime 816A can execute a set of program-specific instructions that utilizes device functions and/or resources in order to: (i) interpret control input from the controller device 850; (ii) control and/or state device movement based on the interpretation of the input; and/or (iii) communicate information from the self-propelled device 810 to the controller device 850.

The program runtime 816A can implement drive control logic 831, including sensor control logic 821 and input control logic 823. The sensor control logic 821 can interpret device sensor input 811 for controlling speed, direction, or other movement of the self-propelled device's drive system or assembly. The sensor input 811 can correspond to data such as provided from the accelerometer(s), magnetometer(s), and/or gyroscope(s) of the self-propelled device 810. The sensor data can also include other information obtained on a device regarding the device's movement, position, state or operating conditions, including GPS data, temperature data, etc. The program 816A can implement parameters, rules or instructions for interpreting sensor input 811 as drive assembly control parameters 825. The input control logic 823 can interpret control input 813 received from the controller device 850. In some implementations, the logic 823 can interpret the input as a command, in outputting drive assembly control parameters 825 that are determined from the input 813. The input drive logic 823 can also be program specific, so that the control input 813 and/or its interpretation are specific to the runtime program 816A. The drive assembly control logic can use the parameters, as generated through sensor/input control logic 821, 823 to implement drive assembly controls.

In variations, the sensor/input control logic 821, 823 can be used to control other aspects of the self-propelled device 810. In variations, the sensor/input control logic 821, 823 can execute runtime program 816A instructions to generate a state output 827 that can control a state of the device in response to some condition, such as user input or device operation condition (e.g., the device comes to stop). For example, an illumination output (e.g., LED display out), audio output, or device operational status (e.g., mode of operation and/or power state) can be affected by the state output 827.

Additionally, the run time program 816A can generate an output interface 826 for the self-propelled device program 856 running on the controller device 850. The output interface 826 can generate the data that comprises feedback 818. For example, the output interface 826 can generate data that is based on position, movement (e.g., velocity, rotation), state (e.g., state of output devices), and/or orientation information (e.g., position and orientation of the device relative to the initial reference frame). The output interface 826 can also generate data that, for example, identifies events that are relevant to the runtime program 816A. For example, the output interface 826 can identify events such as the device being disrupted in its motion or otherwise encountering a disruptive event. The output interface 826 can also generate program specific output, based on, for example, instructions of the runtime program 816A. For example, the run-time program 816A can require a sensor reading that another program would not require. The output interface 826 can implement instructions for obtaining the sensor reading in connection with other operations performed through implementation of the runtime program 816A.

Furthermore, the self-propelled device 810 can be operable in multiple modes relative to the controller device 850. In a controlled mode, the self-propelled device 810 can be controlled in its movement and/or state by control input 813 via control signals communicated from the controller device 850. In some implementations, the self-propelled device 810 can pair with the controller device 850 in a manner that affects operations on the controller device 850 as to control or feedback. The self-propelled device 810 can also be operable in an autonomous mode, where control parameters 825 are generated programmatically on the device in response to, for example, sensor input 811 and without need for control input 813. Further, the self-propelled device 810 can be operated along with the controller device 850 in a "touch and drive" mode, wherein the user can touch a selected location on a video stream of the self-propelled device 810, and the self-propelled device 810 can autonomously maneuver to the corresponding location. Still further, in variations, the self-propelled device 810 can act as a controller, either for the controller device 850 or for another self-propelled device 810. For example, the device can move to affect a state of the controller device 850. The device can operate in multiple modes during one operating session. The mode of operation can be determined by the runtime program 816A.

The self-propelled device 810 can include a library of instruction sets for interpreting control input 813 from the controller device 850. For example, the self-propelled device can store instructions for multiple programs, and the instructions for at least some of the programs can include counterpart programs that execute on the controller device 850. The library maintained on the self-propelled device can be dynamic, in that the instructions stored can be added, deleted or modified. For example, a program stored on the self-propelled device can be added, or another program can be modified.

When executed on the controller device 850, each program includes instructions to recognize a particular set of inputs, and different programs can recognize different inputs. For example, a golf program can recognize a swing motion on the controller device 850 as an input, while the same motion can be ignored by another program that is dedicated to providing a virtual steering mechanism. When executed on the self-propelled device 810, each program can include instructions to interpret or map the control input 813 associated with a particular recognized input to a command and control parameter.

In variations, the self-propelled device can be able to dynamically reconfigure its program library. For example a program can be modified (e.g., through instructions received by the controller device 810) to process control input 813 that corresponds to a new recognized input. As another example, the self-propelled device 810 can be able to switch programs while the self-propelled device 810 is in use. When programs are switched, a different set of inputs can be recognized, and/or each input can be interpreted differently on the self-propelled device 810.

Touch and Drive Method

Figure 9:
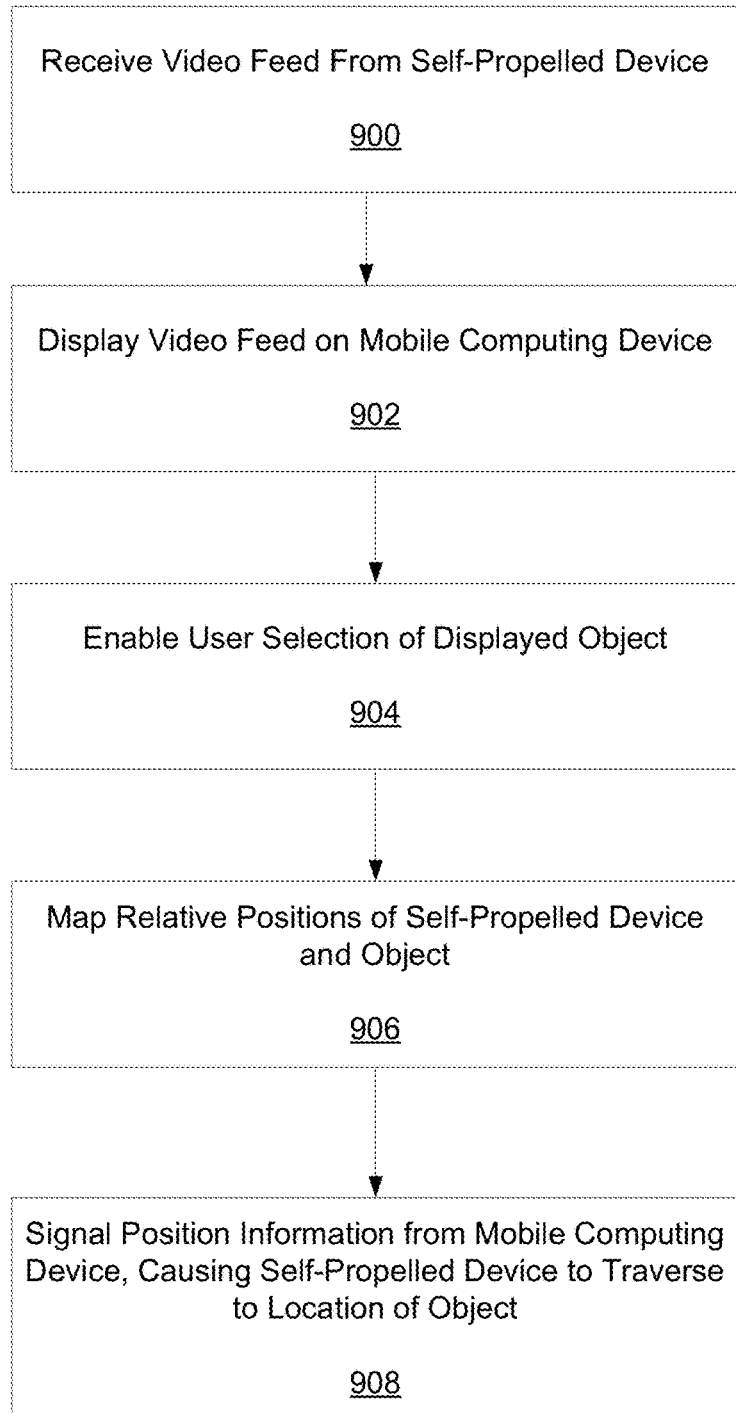
FIG. 9 is an example flow chart illustrating a method of operating a self-propelled device.

FIG. 9 is a flow chart illustrating an example method of operating a self-propelled device. Referring to FIG. 9, a user of a controller device (e.g., a smart phone, table, remote control, or other mobile computing device) can receive an image or a video feed from a self-propelled device. The self-propelled device need not be spherical in nature, but rather can be any device capable of being controlled by a controller device as described herein. The self-propelled device can be configured to include, among other features, a transparent spherical housing, a camera positioned within the housing, and a wireless link which can stream the video feed to the controller device. In this manner, the controller device can receive the feed from the camera positioned within the self-propelled device (900). Further, the controller device can include a display screen, such that the feed can be displayed on the controller device (902). The controller device can include touch screen features that allow the user to interact directly with the displayed feed.

The user can then select an object or location point on the displayed video feed. Accordingly, the user selection of the location point is received by the controller device (904). The user can select the location point by touching an object on the screen corresponding to the physical object in the self-propelled device's frame of reference. Additionally or alternatively, the user can provide voice commands that identify the object being displayed. Upon receiving the selection by the user, the controller device can then generate a command signal based on position information to the self-propelled device, causing it to traverse to the physical location point (908). The self-propelled device can traverse directly to the object, or perform maneuvers around obstacles to ultimately arrive at the object's location.

As an addition or alternative, the controller device can be further configured to determine a position of the object depicted on the display screen based on the user's and/or controller device's reference frame. The controller device can also map the relative position of the location point displayed on the controller device with a position of the location point in the self-propelled device's reference frame (906). In this manner, the self-propelled device can be directed by the controller device to traverse to the location of the object based on the mapped relative positions via the image/video feed, wherein the controller device can include processing means to calculate the relative positions.

CONCLUSION

One or more examples described herein provide that methods, techniques and actions performed by a computing device are performed programmatically, or as a computer-implemented method. Programmatically means through the use of code, or computer-executable instructions. A programmatically performed step may or may not be automatic.

One or more examples described herein can be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more examples described herein may be implemented through the use of instructions that are executable by one or more processors. These instructions may be carried on a computer-readable medium. Machines shown or described with FIGs below provide examples of processing resources and computer-readable mediums on which instructions for implementing examples of the invention can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units (such as CD or DVD units), flash memory (such as carried on many cell phones and tablets)), and magnetic memory. Computers, terminals, network enabled devices (e.g., mobile devices such as cell phones) are all examples of machines and devices that utilize processors, memory and instructions stored on computer-readable mediums. Additionally, examples may be implemented in the form of computer-programs, or a computer usable carrier medium capable of carrying such a program.

Although illustrative examples have been described in detail herein with reference to the accompanying drawings, variations to specific examples and details are encompassed by this disclosure. It is intended that the scope of the invention is defined by the following claims and their equivalents. Furthermore, it is contemplated that a particular feature described, either individually or as part of an example, can be combined with other individually described features, or parts of other examples. Thus, absence of describing combinations should not preclude the inventor(s) from claiming rights to such combinations.

While certain examples of the inventions have been described above, it will be understood that the examples described are by way of example only. Accordingly, the inventions should not be limited based on the described examples. Rather, the scope of the inventions described herein should only be limited in light of the claims that follow when taken in conjunction with the above description and accompanying drawings.

What is claimed is:

1. A self-propelled device comprising:
    a spherical housing;
        a drive system disposed within the spherical housing, the drive system comprising a pair of motors and a pair of wheels, the pair of motors providing independent power to the pair of wheels;
        a carrier mounted atop the drive system and including a top surface; and
        a biasing mechanism comprising: a left portal axle and a right portal axle axially aligned with the left portal axle, the left portal axle and the right portal axle each being mounted to and extending from the top surface at opposing ends of the carrier, the biasing mechanism including at least one spring causing each of the left portal axle and the right portal axle to exert a continuous force against an inner surface of the spherical housing to actively force the drive system to continuously engage the inner surface of the spherical housing in order to cause the spherical housing to roll.

2. The self-propelled device of claim 1, further comprising a protective cover encasing the spherical housing, the protective cover configured to break away during periods of intense shock.

3. The self-propelled device of claim 1, further comprising:
    one or more batteries coupled to the drive system; and
    an inductive charge port coupled to the one or more batteries, the inductive charge port to enable inductive charging of the one or more batteries.

4. The self-propelled device of claim 1, further comprising a charging port coupled to one or more batteries disposed within the self-propelled device and coupled to the drive system, the charging port configured for plug-in charging of the one or more batteries.

5. The self-propelled device of claim 1, further comprising one or more of: a chemical sensor, an infrared sensor, a motion sensor, a listening device, or a biological sensor positioned within the spherical housing.

6. The self-propelled device of claim 1, further comprising one or more explosives positioned within the spherical housing.

7. The self-propelled device of claim 1, wherein the spherical housing is sealable to permit the self-propelled device to be substantially waterproof.

8. The self-propelled device of claim 1, further comprising a receiver coupled with a processor operating the drive system, the receiver to receive an instruction signal from an external controller and transmit the instruction signal to the processor, the processor to execute the instruction signal as a command to the drive system to maneuver the self-propelled device.

9. The self-propelled device of claim 8, wherein the processor operates a door mechanism on the spherical housing, and wherein the spherical housing mechanically opens via the door mechanism upon opening instructions received by the processor from the external controller.

10. The self-propelled device of claim 1, further comprising a stabilizer mounted to the carrier, the stabilizer including a gyroscope to maintain a substantially constant orientation for the carrier when the self-propelled device is in motion.

11. The self-propelled device of claim 10, wherein the stabilizer further includes a dampening system to reduce impact force on the carrier during impacts on the self-propelled device.

12. The self-propelled device of claim 1, wherein each of the left portal axle and the right portal axle comprise a wheel rotation axis parallel to the top surface of the carrier.

13. The self-propelled device of claim 12, wherein the pair of wheels of the drive system rotate about an axis parallel to the top surface of the carrier.

14. The self-propelled device of claim 1, wherein the at least one spring comprises a left spring associated with the left portal axle and a right spring associated with the right portal axle.

* * * * *